United States Patent [19]

Akiyama et al.

[11] Patent Number: 5,949,600
[45] Date of Patent: Sep. 7, 1999

[54] SIGNAL REPRODUCTION METHOD AND MAGNETIC RECORDING AND REPRODUCING APPARATUS USING TUNNEL CURRENT

[75] Inventors: Junichi Akiyama; Yoichiro Tanaka, both of Kawasaki, Japan

[73] Assignee: Kabushiki Kaisha Toshiba, Kawasaki, Japan

[21] Appl. No.: 08/706,688

[22] Filed: Sep. 6, 1996

[30] Foreign Application Priority Data

| Sep. 6, 1995 | [JP] | Japan | 7-229034 |
| Sep. 6, 1995 | [JP] | Japan | 7-229036 |
| Mar. 15, 1996 | [JP] | Japan | 8-059849 |

[51] Int. Cl.$^6$ ................................................. G11B 5/09
[52] U.S. Cl. ....................... 360/55; 369/126; 360/113; 360/103; 360/66
[58] Field of Search ........................... 369/126; 360/113, 360/55, 102, 103, 110, 122, 125, 126, 127, 129, 46, 66, 67; 324/252; 365/157, 158

[56] References Cited

U.S. PATENT DOCUMENTS

| 5,237,529 | 8/1993 | Spitzer. | |
| 5,264,794 | 11/1993 | Burke et al.. | |
| 5,375,087 | 12/1994 | Moreland et al.. | |
| 5,418,667 | 5/1995 | Best et al. | 360/103 |
| 5,583,727 | 12/1996 | Parkin | 360/55 X |
| 5,629,922 | 5/1997 | Moodera et al. | 360/113 X |
| 5,712,612 | 1/1998 | Lee et al. | 360/113 X |

FOREIGN PATENT DOCUMENTS

| 7-235087 | 9/1995 | Japan. | |
| 7-307069 | 11/1996 | Japan | 360/55 |

*Primary Examiner*—Alan Faber
*Attorney, Agent, or Firm*—Oblon, Spivak, McClelland, Maier & Neustadt, P.C.

[57] ABSTRACT

A magnetic recording and reproducing apparatus, including a probe made of a ferromagnetic film movable relative to a magnetic recording medium while having a distal end facing the magnetic recording medium; a head section having a recording element for recording a signal on the magnetic recording medium and a reproducing element including at least a probe for reproducing a signal recording on the magnetic recording medium; and a head slider for mounting the head section. The head slider includes a slider section having a slider surface facing the magnetic recording medium and configured to receive a hydrodynamic force generated by a dynamic effect of a gaseous flow caused by rotation of the magnetic recording medium, and a head support, coupled to the slider section, for supporting the head section such that the reproducing element contacts the magnetic recording medium, the head support having a mass smaller than that of the slider section, an area of a surface of the head support facing the magnetic recording medium being smaller than an area of the slider surface. The apparatus also includes a DC voltage application device for applying a DC voltage between the probe and a recording layer; and a device for detecting a tunnel current flowing between the distal end of the probe and the recording layer through a non-magnetic layer by application of the DC voltage, thereby reproducing a signal recorded on the magnetic recording medium.

10 Claims, 17 Drawing Sheets

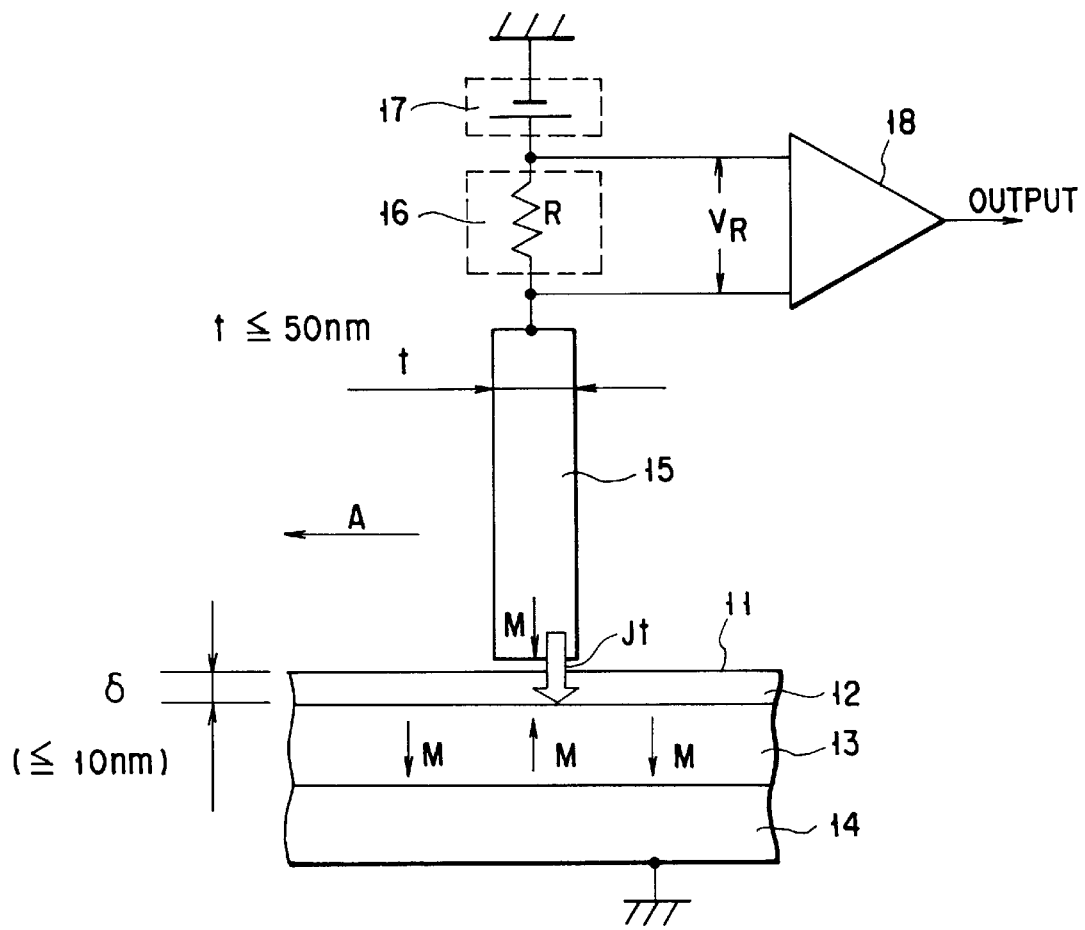
F I G. 5
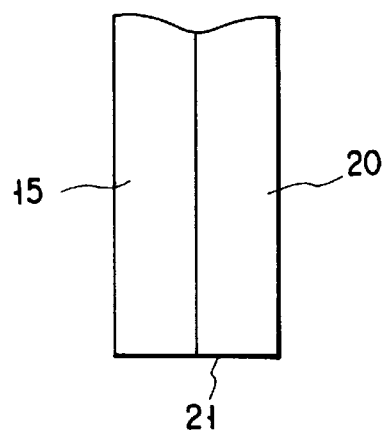
F I G. 6

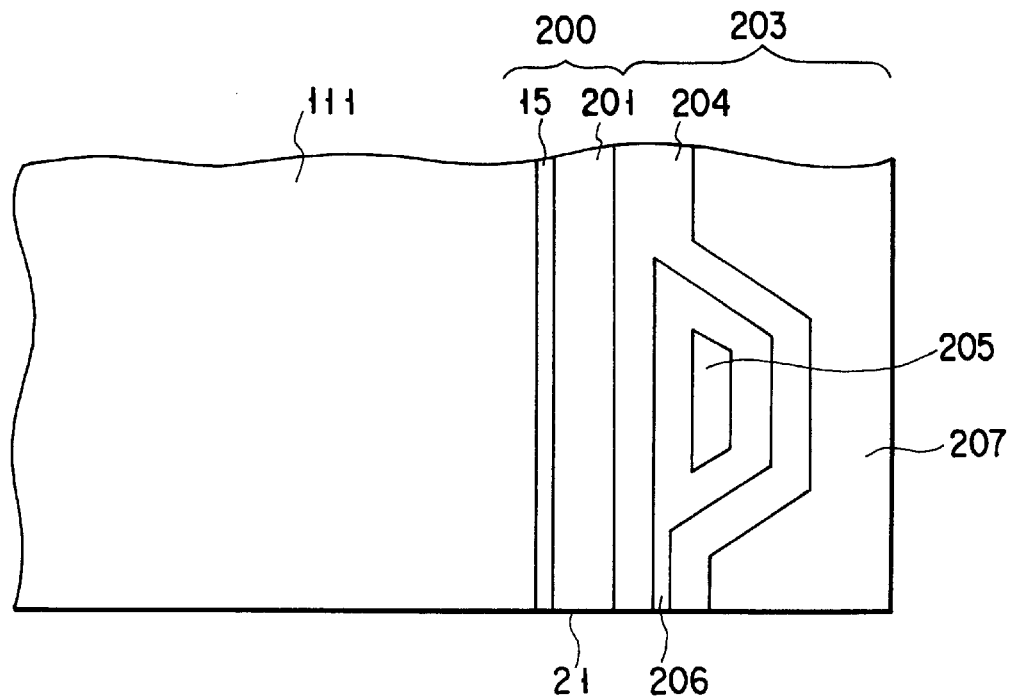
F I G. 11A
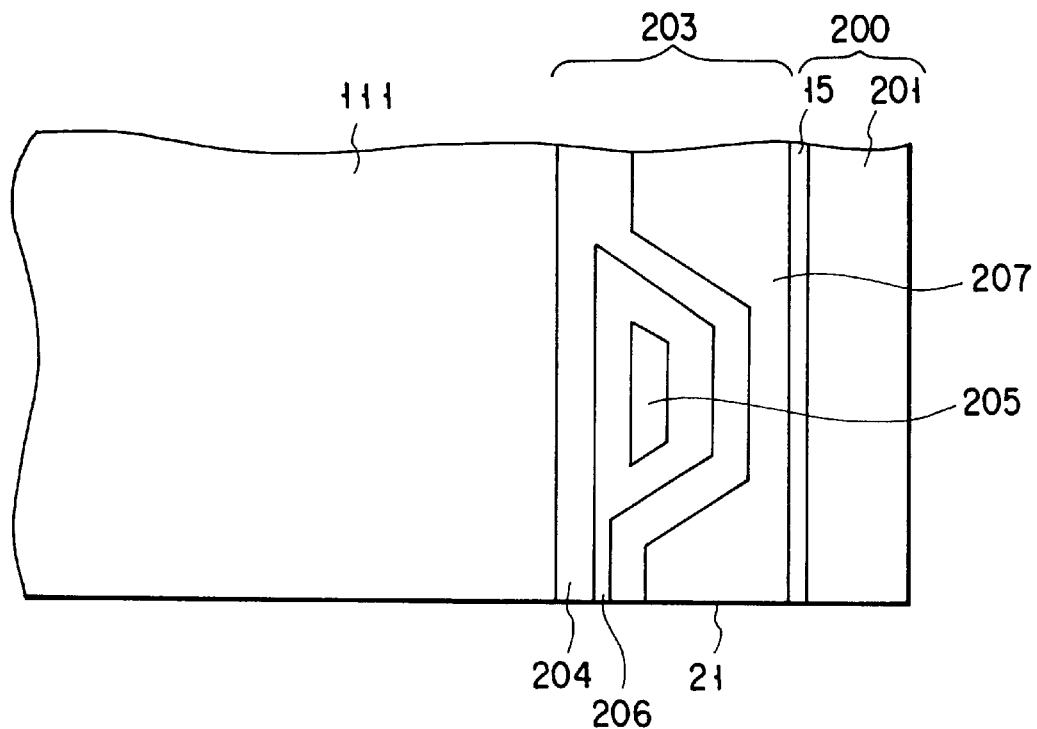
F I G. 11B

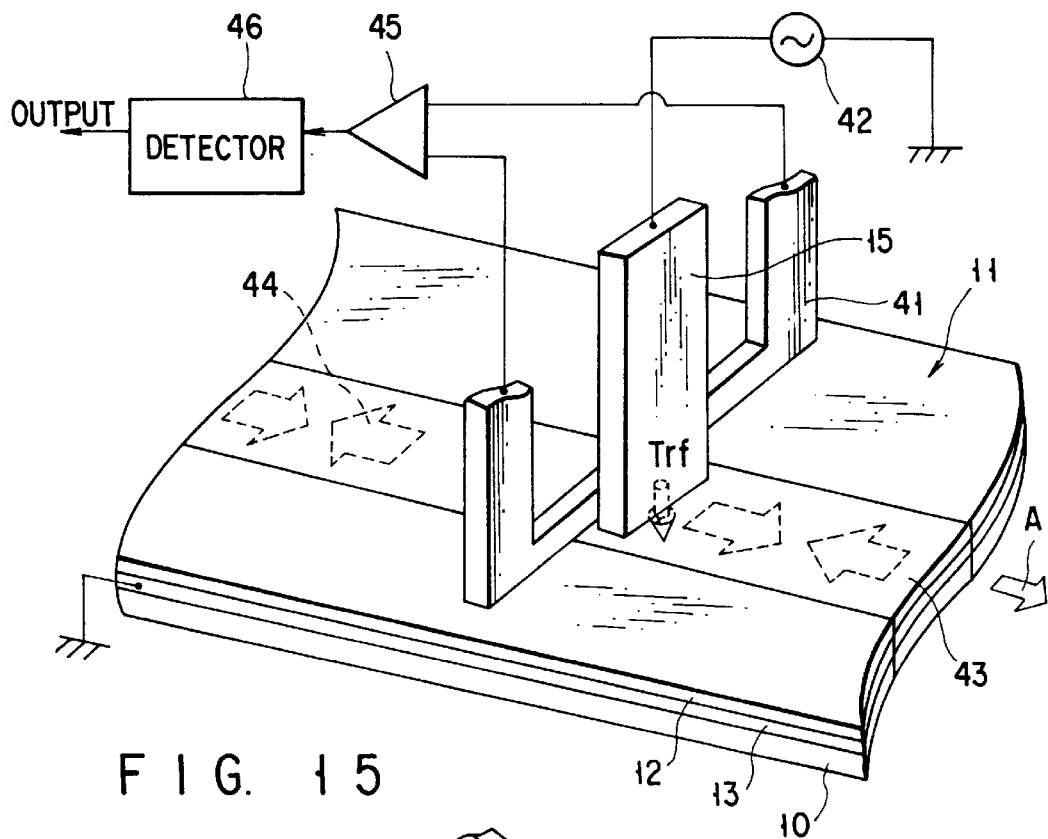
F I G. 15
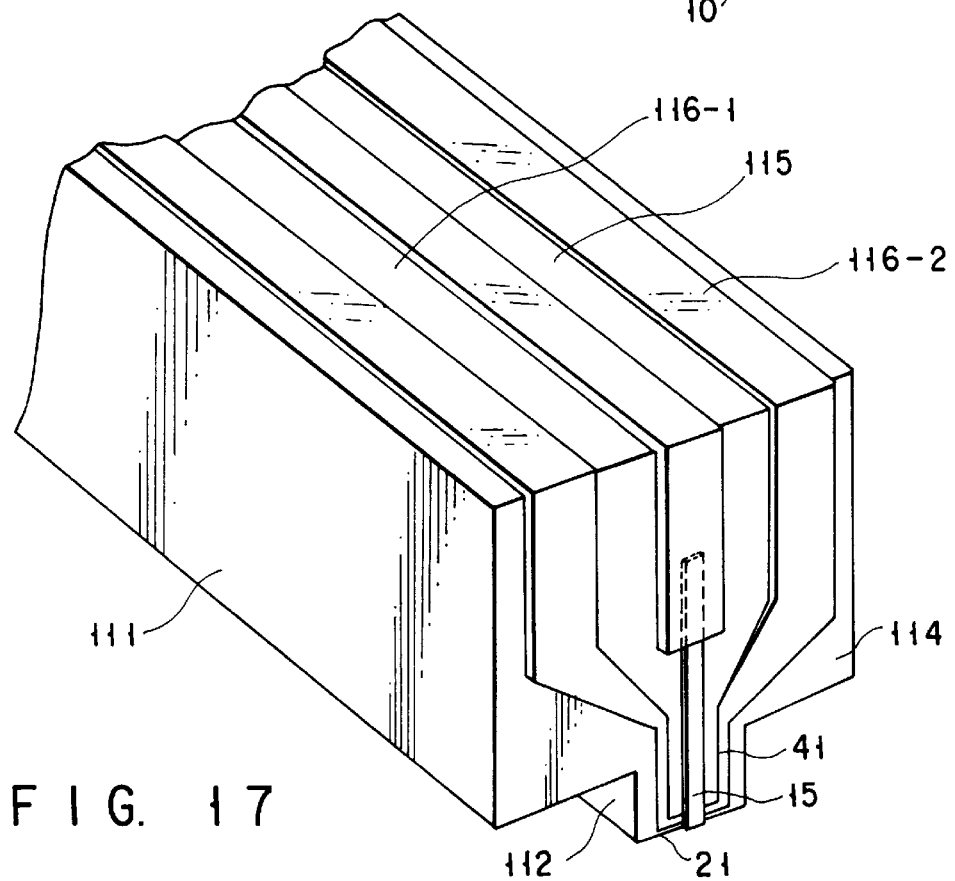
F I G. 17

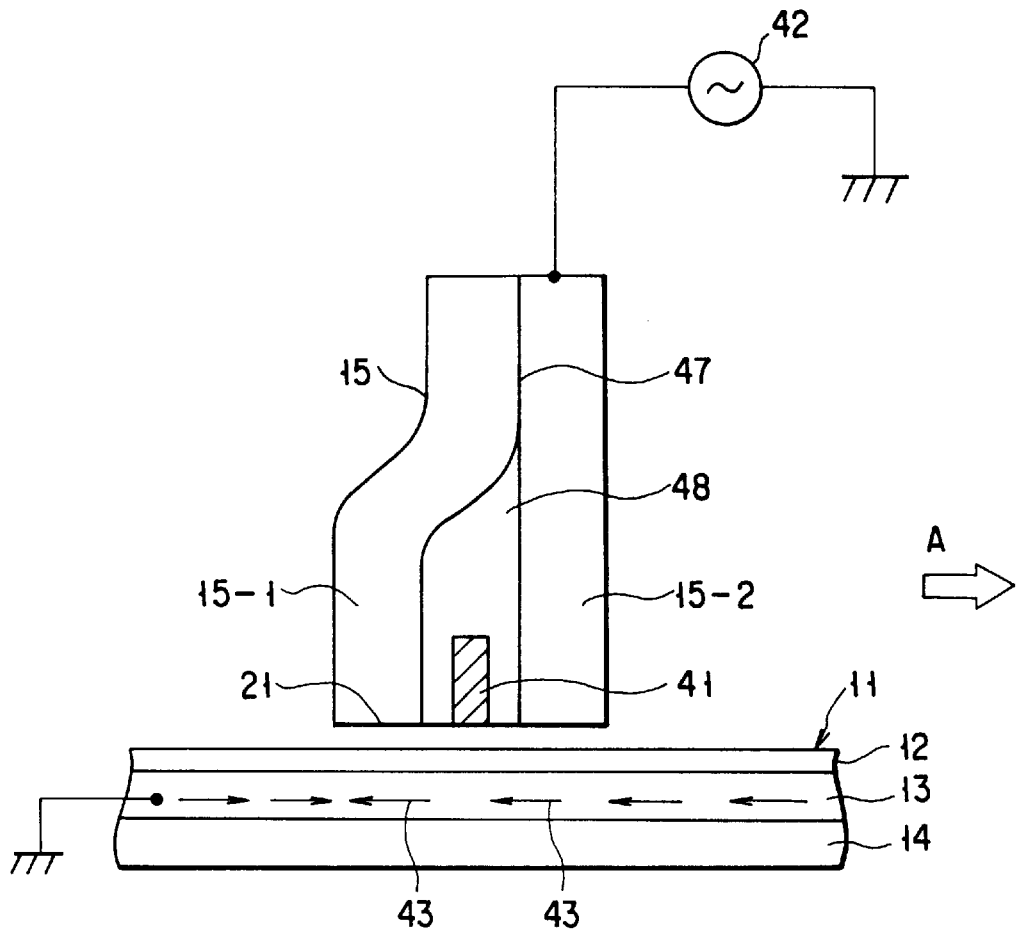
F I G. 16A
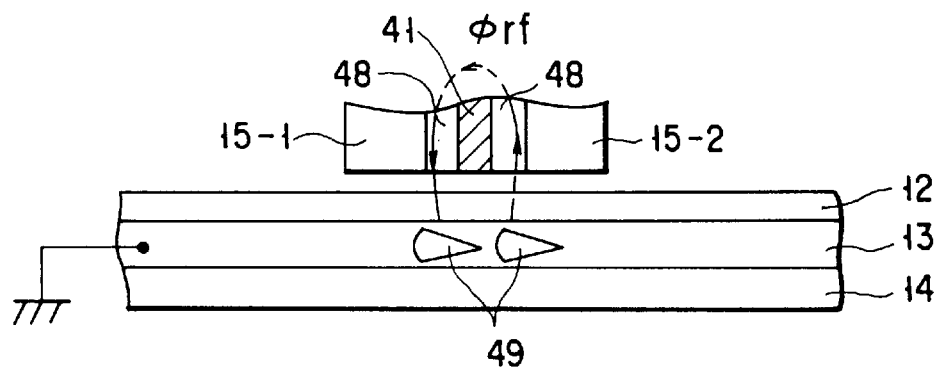
F I G. 16B

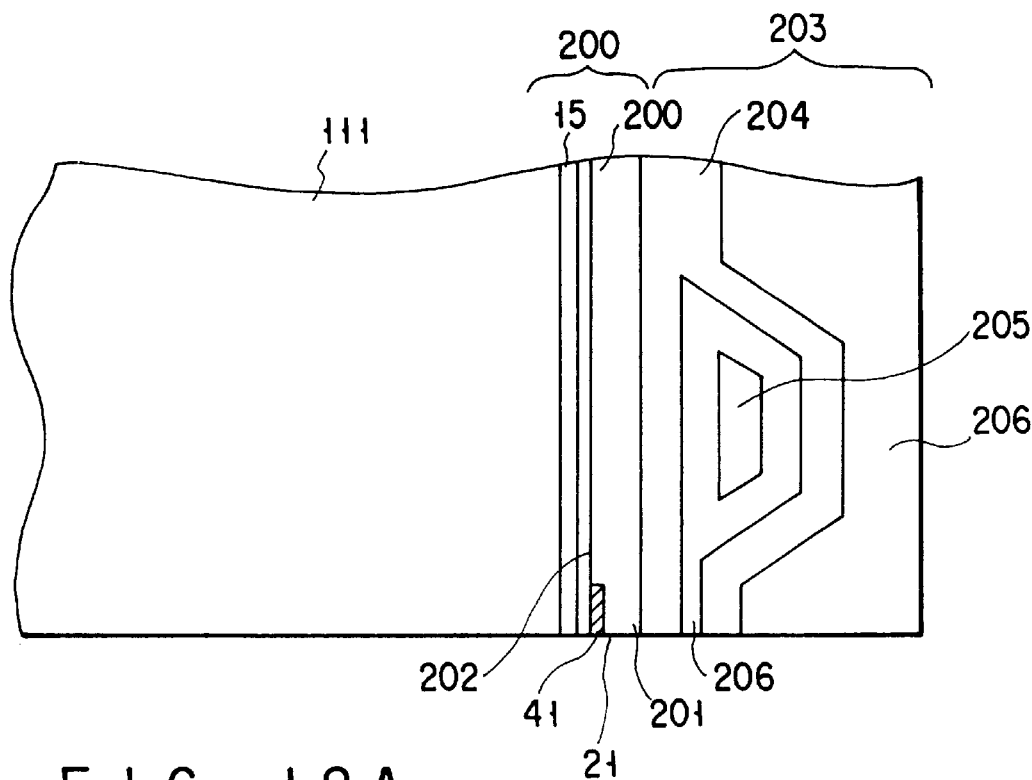
F I G. 18A
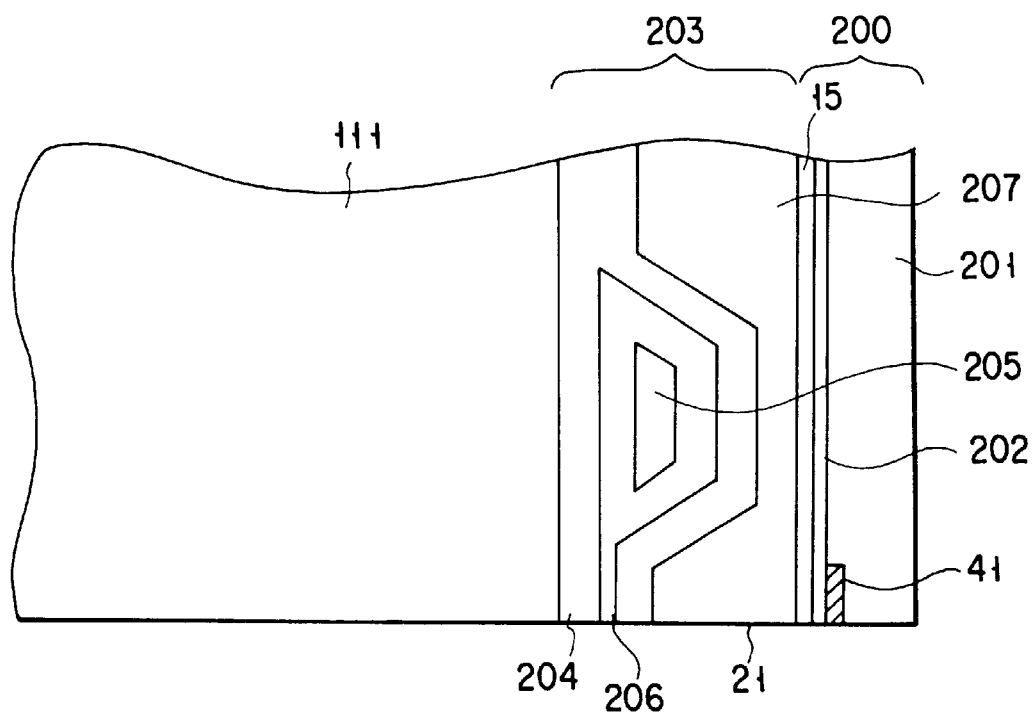
F I G. 18B

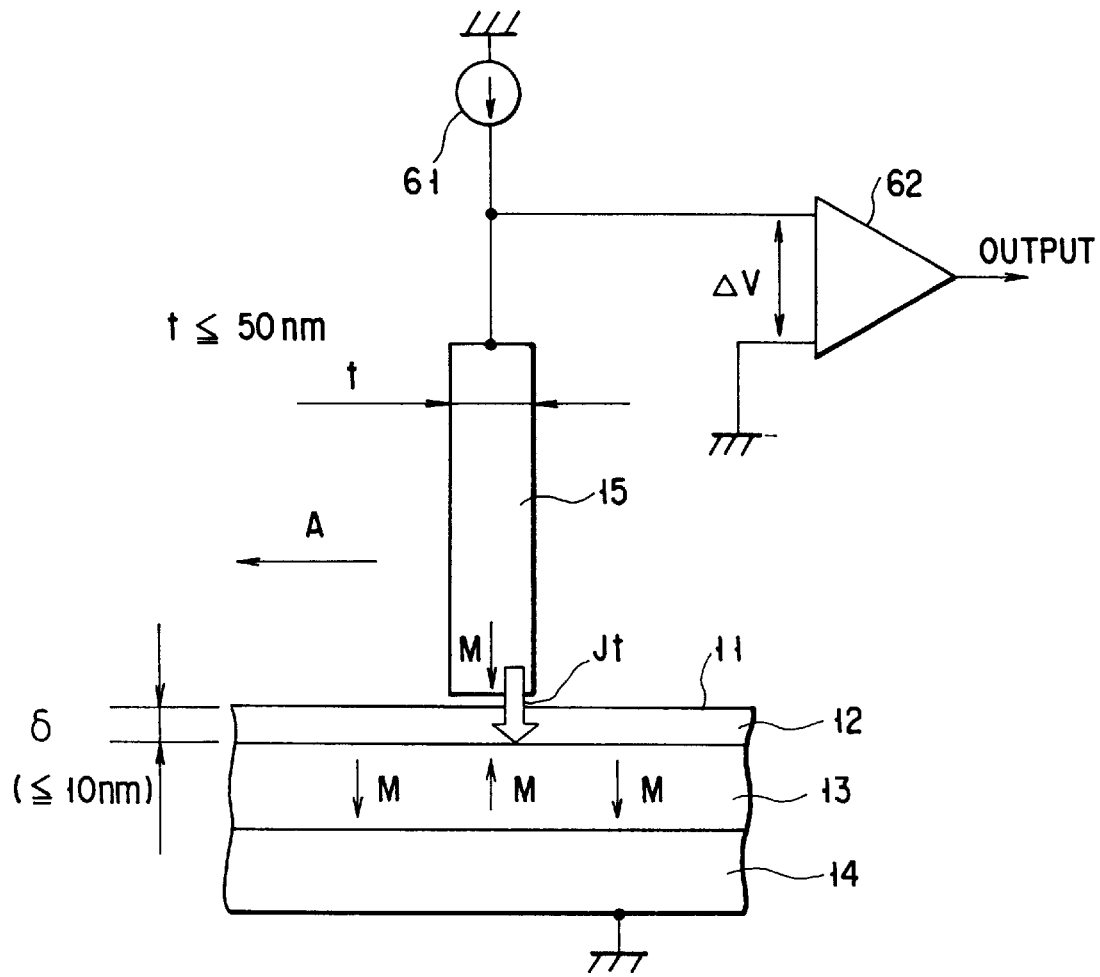
F I G. 20
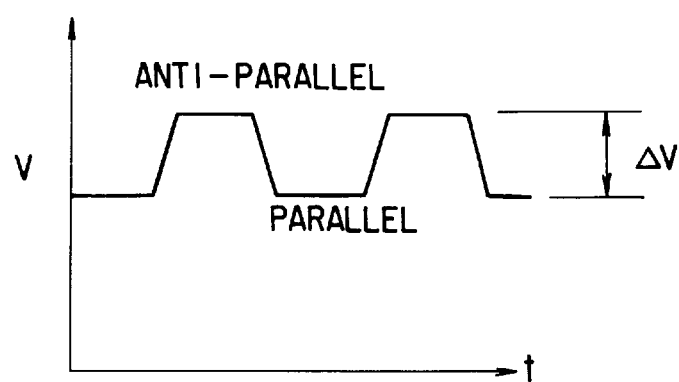
F I G. 21

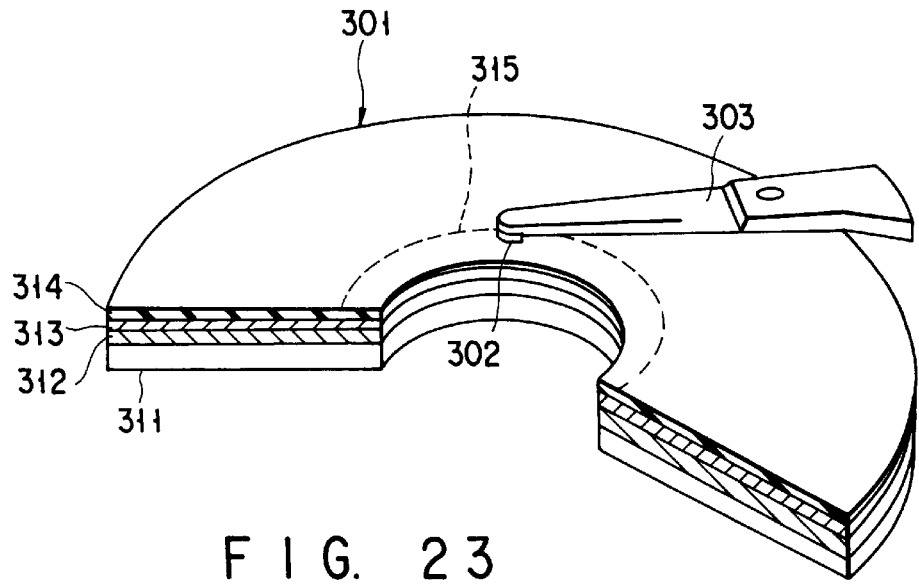
F I G. 23
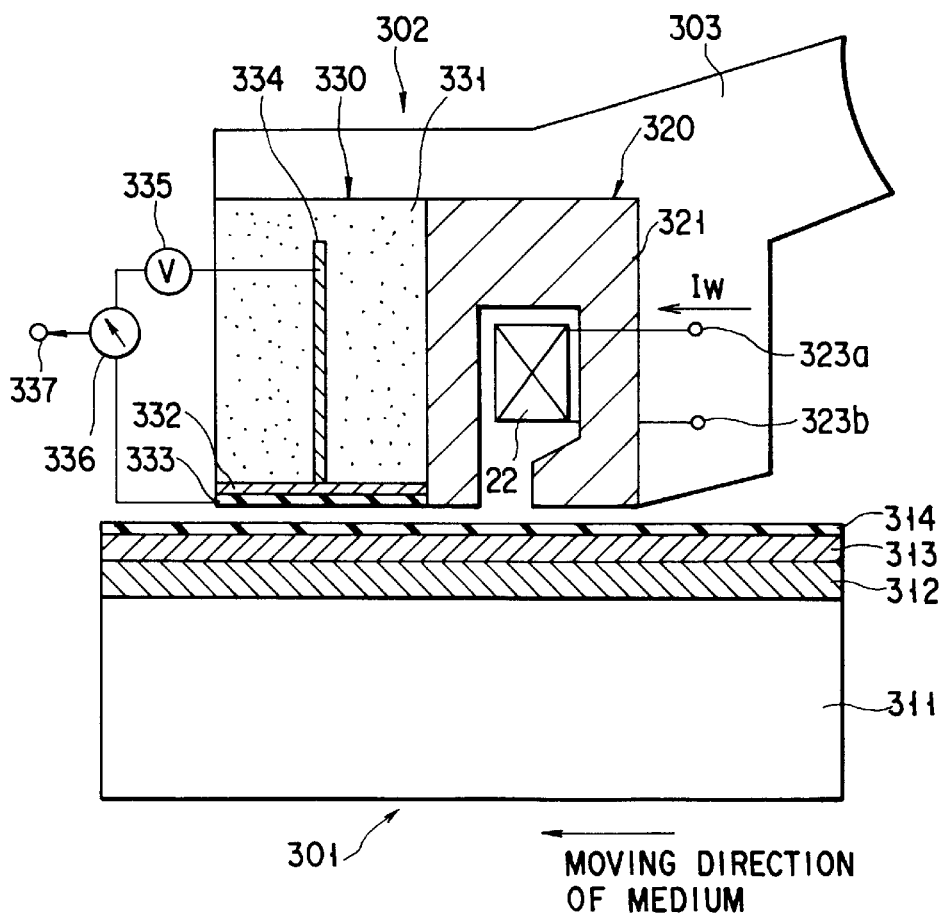
F I G. 24

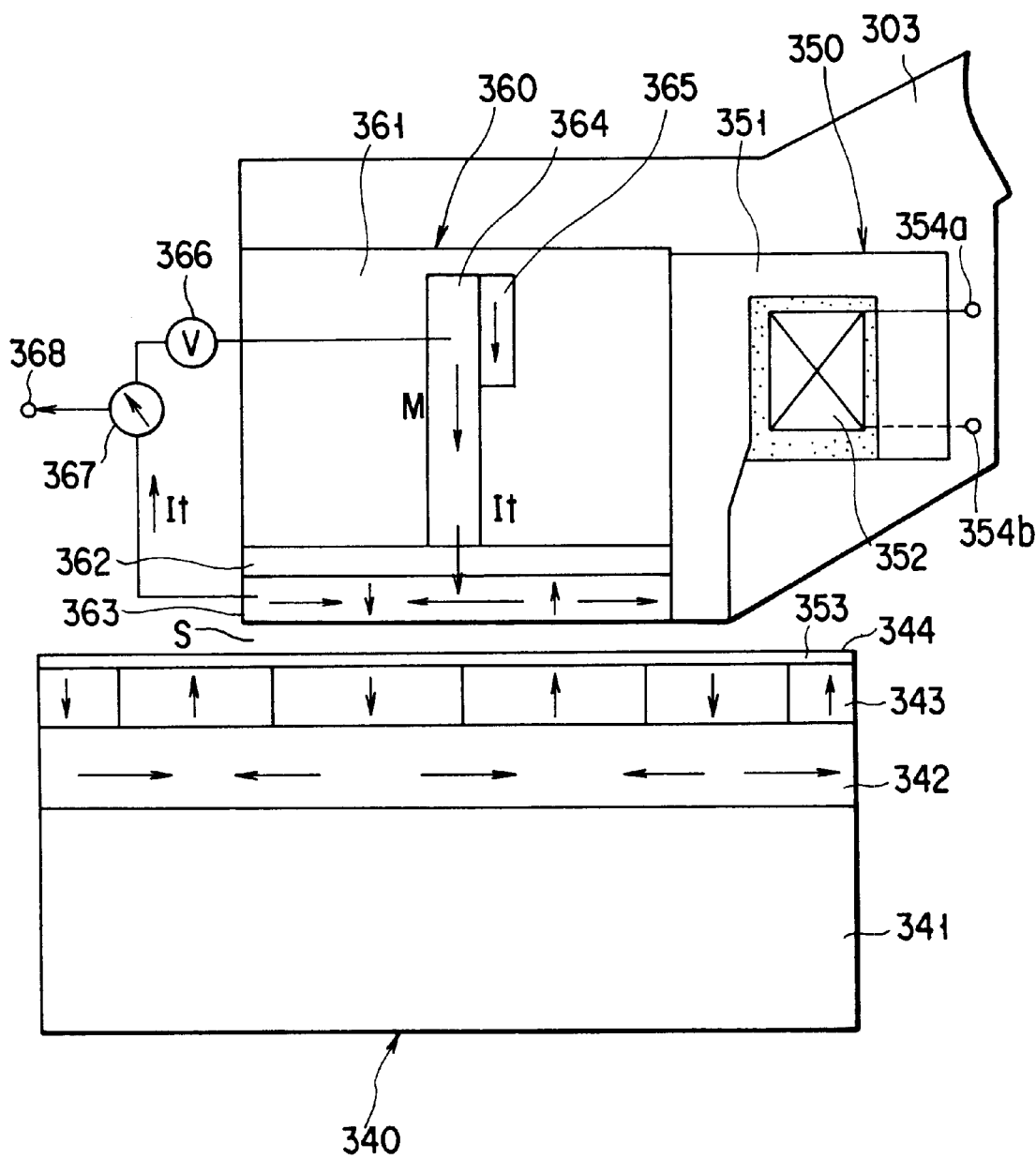
F I G. 27

SIGNAL REPRODUCTION METHOD AND MAGNETIC RECORDING AND REPRODUCING APPARATUS USING TUNNEL CURRENT

BACKGROUND OF THE INVENTION

1. Field of the Invention

The present invention relates to a signal reproduction method for a magnetic recording and reproducing apparatus which accomplishes a high linear recording density and a high track density, and this type of magnetic recording and reproducing apparatus.

2. Description of the Related Art

To improve the linear recording density of magnetic recording and reproducing apparatuses such as a magnetic disk apparatus, in general, it is essential to reduce the magnetic gap length of the magnetic heads, particularly, the reproducing head, in addition to the improvement of the performance of a magnetic recording medium and the reduction of the spacing between the head and the medium.

Even when the magnetic gap length of the reproducing head is shortened, the throat height of the magnetic gap should be reduced in order to secure the reproduction output. This demands the high-precision processing of the throat height, which seems difficult to achieve according to the state-of-the-art processing technology. When the contact recording which causes the magnetic head to contact a magnetic recording medium in recording signals is employed as the recording density of a magnetic disk apparatus is improved, however, the magnetic gap may be worn or disappear quickly. Under this circumstance, as far as the reproduction is concerned, the technology that ensure signal reproduction with a super high linear resolution as compared with the prior art is desired.

As mentioned above, the conventional signal reproduction technology for magnetic recording and reproducing apparatuses has a difficulty to further increase the linear resolution at the time of signal reproduction.

It is an object of the present invention to provide a signal reproduction method and a magnetic recording and reproducing apparatus, which can significantly improve the linear resolution (linear recording density) and can accomplish signal reproduction at a high precision and a high SN ratio over a wide frequency band.

SUMMARY OF THE INVENTION

To achieve the above object, a signal reproduction method according to the first aspect of this invention comprises the steps of providing a probe made of a ferromagnetic film in such a way as to be movable relative to a magnetic recording medium having a conductive recording layer while having a distal end facing the magnetic recording medium; causing a tunnel current to flow between the distal end of the probe and the magnetic recording medium; and detecting a change in the tunnel current or a voltage produced between said probe and said magnetic recording medium in accordance with the tunnel current to reproduce a signal recorded on the magnetic recording medium.

According to the first aspect of this invention, there is also provided a magnetic recording and reproducing apparatus for performing signal recording and reproduction using a magnetic recording medium having a non-conductive non-magnetic layer provided on a conductive recording layer, which comprises a probe made of a ferromagnetic film in such a way as to be movable relative to the magnetic recording medium while having a distal end facing the magnetic recording medium; DC voltage application means for applying a DC voltage between the probe and the recording layer; and means for detecting a tunnel current caused to flow between the distal end of the probe and the recording layer through the non-magnetic layer by application of the DC voltage by the DC voltage application means, thereby reproducing a signal recorded on the magnetic recording medium.

When a tunnel current flows between them through the non-conductive non-magnetic layer, with a constant applied voltage, the tunnel current density changes in accordance with an angle defined by the magnetization of the probe and the magnetization of the recording layer, and the electric resistance of the non-magnetic layer varies in accordance with a change in this angle. The tunnel current therefore varies in accordance with the recording magnetization of the recording layer which is based on signals recorded on a magnetic recording medium. By detecting a change in this tunnel current, therefore, it is possible to reproduce the magnetization of the recording layer or signals recorded on the magnetic recording medium.

In this case, since the area where the tunnel current flows is approximately equal to the area of the probe which faces the magnetic recording medium, a significant high reproduction resolution is easily acquired by making the probe thinner to reduce the area of the medium facing surface of the probe.

According to the first aspect of this invention, it is preferable to select the DC voltage to be applied to the probe in such a manner that the value of the tunnel current becomes $1 \times 10^{11} \times S$ [A] where S is the area of the surface of the probe which faces the magnetic recording medium.

When a resistor connected in series to the probe is used to detect the tunnel current in the first aspect of this invention, the resistance of this current-detecting resistor is preferably equal to or smaller than 100 K.

According to the second aspect of this invention, there is also provided a magnetic recording and reproducing apparatus for performing signal recording and reproduction using a magnetic recording medium having a non-conductive non-magnetic layer provided on a conductive recording layer, which comprises a probe made of a ferromagnetic film in such a way as to be movable relative to the magnetic recording medium while having a distal end facing the magnetic recording medium; constant current supply means connected to the probe; and means for detecting a change in a voltage produced between the probe and the recording layer based on a constant tunnel current flowing between the distal end of the probe and the recording layer through the non-magnetic layer by supply of a constant current from the constant current supply means.

When the tunnel current is caused to flow between the probe and the recording layer through the non-conductive non-magnetic layer, the electric resistance (or electric conductance) of the non-magnetic layer varies in accordance with a change in the angle defined by the magnetization of the probe and the magnetization of the recording layer, so that a voltage produced between the probe and the recording layer varies in accordance with a change in this resistance. By detecting this voltage change, therefore, it is possible to reproduce the magnetization of the recording layer or signals recorded on the magnetic recording medium.

In this case too, since the area where the tunnel current flows is approximately equal to the area of the probe which faces the magnetic recording medium, a significant high reproduction resolution is easily acquired by making the probe thinner to reduce the area of the medium facing surface of the probe.

According to the first and second aspects of the invention, it is preferable that the film thickness of the probe be equal to or smaller than 50 nm and the thickness of the non-conductive non-magnetic layer be equal to or smaller than 10 nm.

In the magnetic recording and reproducing apparatus according to the first and second aspects of this invention, it is preferable that the probe have an anti-ferromagnetic film or a hard magnetic film stacked thereon to fix magnetization of the probe in a predetermined direction. This design can prevent the magnetization of the probe from becoming unstable by a change in the signal field which the probe receives through the recording magnetization of the recording layer at the time of signal reproduction, thus ensuring more stable signal reproduction with a higher signal-to-noise ratio.

It is also preferable in the first and second aspects of this invention that the probe should be surrounded by an insulating layer with an excellent thermal conductivity, excluding the medium facing surface.

In the case where the magnetic recording and reproducing apparatuses according to the first and second aspects of this invention are designed as a fixed magnetic disk apparatus, a head section comprises a recording element for recording a signal on a rotatable disk-shaped magnetic recording medium and a reproducing element including at least the probe for reproducing a signal recorded on the magnetic recording medium, and this head section is mounted on a head slider. The head slider comprises a slider section having a slider surface facing the magnetic recording medium in such a way as to receive a hydrodynamic force generated by a dynamic effect of a gaseous flow caused by rotation of the magnetic recording medium, and a head support, coupled to the slider section, for supporting the head section in such a way that a distal end of the head section contacts the magnetic recording medium, the head support having a mass smaller than that of the slider section, an area of a face of the head support facing the magnetic recording medium being smaller than an area of the slider surface.

According to the thus constituted fixed magnetic disk apparatus, the head section comprising the reproducing element having the probe as the essential element and the recording element can stably and reliably move while in contact with the magnetic recording medium. At the time of signal reproduction, therefore, a variation in the tunnel current flowing to the magnetic disk from the probe, which is caused by a change in spacing, becomes considerably smaller, thus ensuring stable signal reproduction with a high SN ratio.

It is preferable that the magnetic recording and reproducing apparatus according to the first aspect of this invention should further comprise current detection means for detecting the tunnel current; a low-pass filter for receiving an output signal of the current detection means; and control means for controlling a DC voltage to be applied by the DC voltage application means based on a difference between an output signal of the low-pass filter and a target signal. This structure can prevent the tunnel current from changing due to the surface fluctuation or the surface undulation of the recording medium, thus ensuring more stable signal reproduction.

It is preferable that the probe in the magnetic recording and reproducing apparatuses according to the first and second aspects of this invention should be designed to have a width which is approximately equal to the reproduction track width in the vicinity of the medium facing surface and which is wider than the reproduction track width at the deep portion of the head. This structure reduces the electric resistance of the entire probe and makes the density of the current flowing through the probe at the head's deep part smaller than the current density in the vicinity of the medium facing surface. It is therefore possible to suppress heating of the whole probe and permit a greater tunnel current to flow, thus providing a larger reproduction signal output.

A signal reproduction method according to the third aspect of this invention comprises the steps of providing a probe made of a ferromagnetic film in such a way as to be movable relative to a magnetic recording medium having a conductive recording layer while having a distal end facing the magnetic recording medium; applying a high-frequency voltage between the probe and the recording layer to permit a tunnel current to flow between the distal end of the probe and the magnetic recording medium, thereby generating ferromagnetic resonance in recording magnetization of the recording layer directly under the probe; and detecting a high-frequency flux generated from the recording magnetization by the ferromagnetic resonance to reproduce a signal recorded on the magnetic recording medium.

According to the third aspect of this invention, there is also provided a magnetic recording and reproducing apparatus for performing signal recording and reproduction using a magnetic recording medium having a non-conductive non-magnetic layer provided on conductive recording layer, which comprises a probe made of a ferromagnetic film in such a way as to be movable relative to the magnetic recording medium while having a distal end facing the magnetic recording medium; high-frequency voltage application means for applying a high-frequency voltage between the probe and the recording layer, the high-frequency voltage having such a frequency as to permit magnetization in the recording layer directly under the probe to cause ferromagnetic resonance; a detection coil provided in a vicinity of the probe to be movable relative to the magnetic recording medium together with the probe, for detecting a change in a high-frequency flux generated from recording magnetization of the recording layer based on a high-frequency tunnel current caused to flow between the distal end of the probe and the recording layer by application of the high-frequency voltage by the high-frequency voltage application means, and outputting a detection signal corresponding to a change in the high-frequency flux; and detection means for detecting the detection signal output from the detection coil to reproduce a reproduced signal corresponding to a signal recorded on the magnetic recording medium. To prevent the probe and the detection coil from being coupled together and acquire high-quality reproduced signals, the probe and the detection coil should preferably be arranged to be electromagnetically perpendicular to each other.

In the case where a predetermined high-frequency voltage is applied between the probe and the recording layer to allow a high-frequency tunnel current to flow therebetween through the non-conductive non-magnetic layer, this tunnel current generates a high-frequency flux which is in turn applied to the recording magnetization of the recording layer directly under the probe. When the frequency of the high-frequency voltage is so set as to cause ferromagnetic resonance and the probe is moved relative to the magnetic recording medium, the ferromagnetic resonance condition changes in accordance with a change the recording magnetization. When the ferromagnetic resonance occurs, the recording magnetization causes a precession in the recording layer and high-frequency magnetization occurs. The high-frequency flux which is produced by the high-frequency magnetization generated from this recording magnetization is detected by the detection coil which is located near the probe and a high-frequency induced electromotive force is produced across the detection coil. Because this induced electromotive force or the output signal of the detection coil is modulated by a change in recording magnetization, signals recorded on the magnetic recording medium can be reproduced by detecting this output signal.

A signal reproduction method according to the fourth aspect of this invention comprises the steps of providing a probe made of a ferromagnetic film in such a way as to be movable relative to a magnetic recording medium having a conductive recording layer while having a distal end facing the magnetic recording medium; permitting a constant high-frequency tunnel current to flow between the distal end of the probe and the magnetic recording medium to generate ferromagnetic resonance in recording magnetization of the recording layer directly under the probe; and detecting a high-frequency flux generated from the recording magnetization by the ferromagnetic resonance to reproduce a signal recorded on the magnetic recording medium.

According to the third aspect of this invention, there is provided a magnetic recording and reproducing apparatus for performing signal recording and reproduction using a magnetic recording medium having a non-conductive non-magnetic layer provided on a conductive recording layer, which comprises a probe made of a ferromagnetic film in such a way as to be movable relative to the magnetic recording medium while having a distal end facing the magnetic recording medium; high-frequency current supply means, connected to the probe, for supplying a constant high-frequency current having such a frequency as to permit magnetization in the recording layer directly under the probe to cause ferromagnetic resonance; a detection coil provided in a vicinity of the probe to be movable relative to the magnetic recording medium together with the probe, for detecting a change in a high-frequency flux generated from recording magnetization of the recording layer based on a constant high-frequency tunnel current caused to flow between the distal end of the probe and the recording layer by supply of the constant high-frequency current by the high-frequency current supply means, and outputting a detection signal corresponding to a change in the high-frequency flux; and detection means for detecting the detection signal output from the detection coil to reproduce a reproduced signal corresponding to a signal recorded on the magnetic recording medium.

In the case where a high-frequency constant current is applied between the probe and the recording layer to allow a high-frequency tunnel current to flow therebetween through the non-conductive non-magnetic layer, this tunnel current generates a high-frequency flux which is in turn applied to the recording magnetization of the recording layer directly under the probe. When the frequency of the high-frequency constant current is so set as to cause ferromagnetic resonance and the probe is moved relative to the magnetic recording medium, the ferromagnetic resonance condition changes in accordance with a change the recording magnetization. When the ferromagnetic resonance occurs, the recording magnetization takes a precession movement in the recording layer to realize high-frequency magnetization. The high-frequency flux which is produced by the high-frequency magnetization generated from this recording magnetization is detected by the detection coil which is located near the probe and a high-frequency induced electromotive force is produced across the detection coil. Because this induced electromotive force or the output signal of the detection coil is modulated by a change in recording magnetization, signals recorded on the magnetic recording medium can be reproduced by detecting this output signal.

In the third and fourth aspects of the invention, since the area where the tunnel current flows is approximately equal to the area of the probe which faces the magnetic recording medium, a significant high reproduction resolution is easily acquired by making the probe thinner to reduce the area of the medium facing surface of the probe.

The ferromagnetic resonance frequency of the recording magnetization is very high, several gigahertz to 20 gigahertz. Even if the high-frequency flux itself is small, therefore, a large induced electromotive force is produced in proportional to the level of that frequency so that a sufficiently large reproduction signal output can be obtained.

In the magnetic recording and reproducing apparatuses according to the third and fourth aspects of the invention, it is preferable that the probe should have at least two conductive films provided along a relative moving direction to the magnetic recording medium, the conductive films should have a predetermined distance therebetween in the relative moving direction in a vicinity of surfaces facing the magnetic recording medium and should electrically be connected together in other portions, and the detection coil should be located between the at least two conductive films in a vicinity of the surfaces facing the magnetic recording medium.

With this structure, because of the high-frequency tunnel currents in two paths which flow directly under the two conductive films constituting the probe, a stronger high-frequency magnetic field which is sharper in the direction of the linear resolution can be applied to the recording magnetization of the recording layer located directly under to thereby ensure signal reproduction with a higher precision and a higher linear resolution.

In the case where the magnetic recording and reproducing apparatuses according to the third and fourth aspects of this invention are designed as a fixed magnetic disk apparatus, a head section comprises a recording element for recording a signal on a rotatable disk-shaped magnetic recording medium and a reproducing element including at least the probe for reproducing a signal recorded on the magnetic recording medium, and this head section is mounted on a head slider. The head slider comprises a slider section having a slider surface facing the magnetic recording medium in such a way as to receive a hydrodynamic force generated by a dynamic effect of a gaseous flow caused by rotation of the magnetic recording medium, and a head support, coupled to the slider section, for supporting the head section in such a way that a distal end of the head section contacts the magnetic recording medium, the head support having a mass smaller than that of the slider section, an area of a face of the head support facing the magnetic recording medium being smaller than an area of the slider surface. Since the head section comprising the reproducing element having the probe as the essential element and the recording element can stably and reliably move while in contact with the magnetic recording medium, therefore, a variation in the tunnel current flowing to the magnetic disk from the probe, which is caused by a change in spacing, becomes considerably smaller at the time of signal reproduction. This ensures stable signal reproduction with a high SN ratio.

It is preferable that the magnetic recording and reproducing apparatus according to the third aspect of this invention should further comprise current detection means for detecting the tunnel current; a low-pass filter for receiving an output signal of the current detection means; and control means for controlling a DC voltage to be applied by the DC voltage application means based on a difference between an output signal of the low-pass filter and a target signal. This structure can prevent the tunnel current from changing due to the surface fluctuation or the surface undulation of the recording medium, thus ensuring more stable signal reproduction.

A signal reproduction method according to this invention comprises the steps of providing a replica magnetic layer facing a magnetic recording medium for forming magnetization corresponding to a magnetic field from the magnetic recording medium; arranging a magnetic electrode close to the replica magnetic layer; and detecting a magnetic tunnel current flowing through the replica magnetic layer and the magnetic electrode to reproduce a signal recorded on the magnetic recording medium.

A magnetic recording and reproducing apparatus according to this invention comprises an insulating layer provided on a surface parallel to said magnetic recording medium and facing said magnetic recording medium, a conductive replica magnetic layer, provided on a face of said insulating layer facing said magnetic recording medium, for forming magnetization corresponding to a magnetic field from said magnetic recording medium, a magnetic electrode provided with one end in contact with an opposite surface of said insulating layer to said surface where said replica magnetic layer is provided, voltage application means for applying a predetermined voltage between said magnetic electrode and said replica magnetic layer, and current detection means for detecting a current flowing between said replica magnetic layer and said magnetic electrode through said insulating layer based on voltage application by said voltage application means.

A magnetic recording and reproducing apparatus according to this invention is characterized in that a non-magnetic insulating member having a medium facing surface parallel to the magnetic recording medium is so provided as to face the magnetic recording medium, an insulating layer and a replica magnetic layer are stacked on the medium facing surface of the non-magnetic insulating member, and a magnetic electrode provided with one end in contact with an opposite surface of the insulating layer to the surface where the replica magnetic layer is provided is covered with this non-magnetic insulating member.

According to this invention, at the time signals recorded on a magnetic recording medium are reproduced, the replica magnetic layer is magnetized in the pattern corresponding to the magnetization pattern on the magnetic recording medium by the leak magnetic field from the magnetic recording medium based on the recorded signals. Because the replica magnetic layer is formed on the surface facing the magnetic recording medium and parallel to the magnetic recording medium, it is hardly affected by self demagnetization and accurately forms the replica of the magnetization. The magnetic electrode is located close to this replica magnetic layer with, for example, an insulating layer in between, so that the magnetization state of the replica magnetic layer is accurately detected while the magnetic electrodes helps maintains the positional relation between the magnetic electrode and the replica magnetic layer.

A predetermined voltage, for example, a constant DC voltage, is applied between the replica magnetic layer and the magnetic electrode which is provided on the replica magnetic layer via the insulating layer, the current which is originated from the magnetic tunnel effect or the magnetic tunnel current flows through the insulating layer depending on the difference between their magnetization states, e.g., the difference between the directions of magnetizations. As the magnetic tunnel effect is the phenomenon in which the current value varies in response only to the magnetization in close vicinity of the magnetic electrode, the magnetization state of the replica magnetic layer can be detected with a significantly high resolution by detecting this magnetic tunnel current.

Since the distance between the replica magnetic layer and the magnetic electrode is fixed to a certain value determined by the thickness of the insulating layer, a change in the magnetic tunnel current purely reflects the magnetization state of the replica magnetic layer. By detecting this magnetic tunnel current, the magnetization state of the magnetic recording medium which is to be transferred on the replica magnetic layer in accordance with the relative movement between the head and the magnetic recording medium can be detected with a high precision so that the signals recorded on the magnetic recording medium can be reproduced with a very high resolution.

Because the replica magnetic layer and the insulating layer are located between the magnetic electrode and the magnetic recording medium, the magnetic electrode does not directly contact the magnetic recording medium and does not wear out even if the spacing between the head and the magnetic recording medium is too small that both are nearly or completely in contact with each other. Thus, stable signal reproduction is possible. Moreover, since the magnetic electrode is covered with the non-magnetic insulating layer, it does not suffer a corrosion-oriented reduction in the characteristics and has an excellent durability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a schematic structural diagram of a magnetic recording and reproducing apparatus according to the first embodiment;

FIG. 6 is a side view showing the essential structure of a magnetic recording and reproducing apparatus according to the second embodiment;

FIGS. 11A and 11B are cross-sectional views showing a recording element and a reproducing element mounted on the head slider according to the fifth embodiment;

FIG. 15 is a schematic structural diagram of a magnetic recording and reproducing apparatus according to the eighth embodiment;

FIGS. 16A and 16B are cross-sectional views showing the structure of a magnetic recording and reproducing apparatus according to the tenth embodiment;

FIG. 17 is a perspective view depicting the essential structure of a magnetic recording and reproducing apparatus according to the eleventh embodiment;

FIGS. 18A and 18B are cross-sectional views showing a recording element and a reproducing element mounted on the head slider according to the eleventh embodiment;

FIG. 20 is a diagram for explaining the third signal reproduction method according to this invention;

FIG. 21 is a diagram showing a voltage change between the probe and the recording layer, which results from a change in the tunnel current density caused by the relative movement of the probe to a magnetic recording medium according to the third signal reproduction method;

FIG. 23 is a perspective view showing the schematic structure of a magnetic recording and reproducing apparatus according to the fourteenth embodiment of this invention;

FIG. 24 is a cross-sectional view depicting the structures of a magnetic recording medium and a magnetic head in a magnetic recording and reproducing apparatus according to this embodiment;

FIG. 27 is a cross-sectional view showing in enlargement the essential portions of a magnetic recording medium and a magnetic head in a magnetic recording and reproducing apparatus according to the fifteenth embodiment.

DETAILED DESCRIPTION OF THE PREFERRED EMBODIMENTS

The first signal reproduction method according to this invention will now be described with reference to FIGS. 1 through 4.

Figure 1:
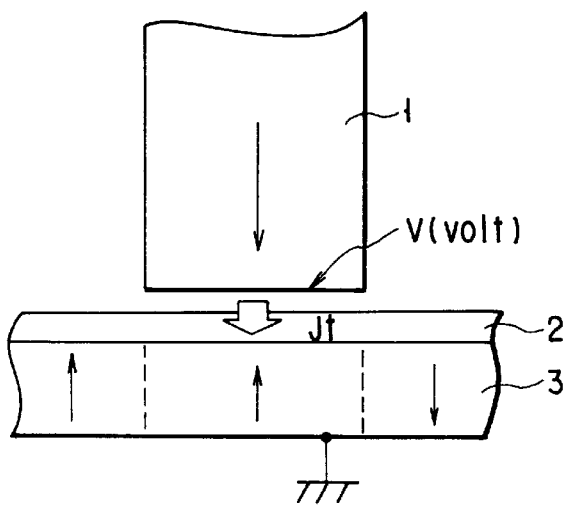
FIG. 1 is a diagram for explaining the first signal reproduction method according to this invention.
Figure 2:
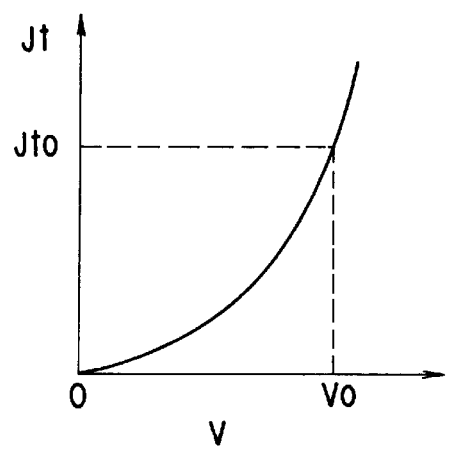
FIG. 2 is a diagram showing the relationship between the applied voltage and the tunnel current density.

As shown in FIG. 1, a very thin (about 10 nm) non-conductive non-magnetic layer 2 is formed on a recording layer 3, forming a magnetic recording medium. A probe 1 comprised of a conductive ferromagnetic film is positioned above this magnetic recording medium with its distal end facing the magnetic recording medium in such a way that the probe 1 is in contact or nearly in contact with this magnetic recording medium. When a predetermined DC voltage V is applied between the probe 1 and the recording layer 3, a tunnel current flows between the probe 1 and the recording layer 3 through the non-magnetic layer 2. The non-conductive non-magnetic layer 2 may be an insulator or a semiconductor layer. FIG. 2 shows the relation between this tunnel current density Jt and the applied voltage V.

Figure 3:
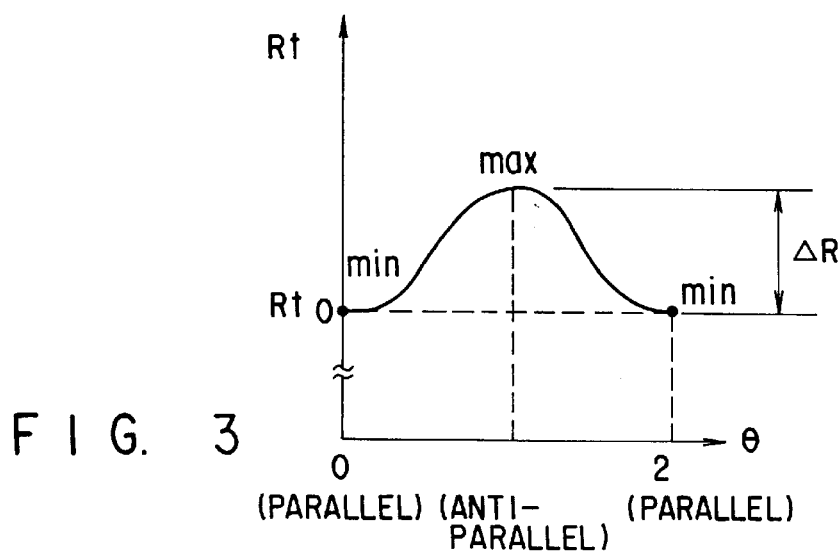
FIG. 3 is a diagram illustrating the relationship between an angle defined by the magnetization of a probe and the magnetization of a recording layer and the electric resistance of a non-magnetic insulating layer.

With the applied voltage V set constant, the tunnel current density Jt changes in accordance with the angle $\theta$ defined by the magnetization of the probe 1 and the magnetization of the recording layer 3. As this angle $\theta$ varies, therefore, the electric resistance Rt (or its reciprocal; the electric conductance Gt) of the non-magnetic layer 2 changes too as shown in FIG. 3. Such a phenomenon is called "magnetic tunnel effect." It is generally known that this electric resistance Rt is minimum when the magnetization of the probe 1 and the magnetization of the recording layer 3 are parallel ($\theta=0°$ or $360°$) and is maximum when those magnetizations are anti-parallel ($\theta=180°$).

Figure 4:
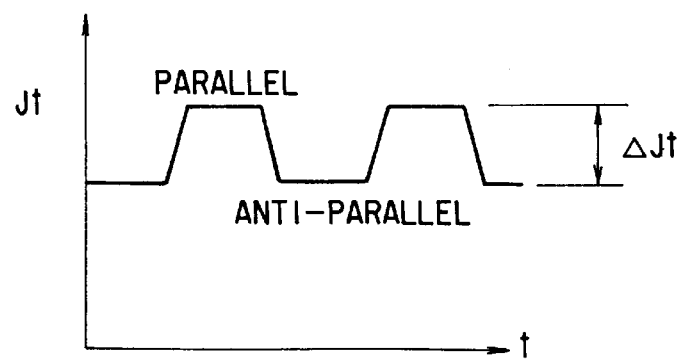
FIG. 4 is a diagram showing a change in the time of the tunnel current density which is caused by the relative movement of the probe to a magnetic recording medium.

As the probe 1 is moved relative to the magnetic recording medium which has recording magnetization formed on the recording layer 3 while contacting the magnetic recording medium, the tunnel current density Jt changes in accordance with the recording magnetization of the recording layer 3 as shown in FIG. 4. By detecting a change $\Delta$Jt in the tunnel current density Jt, therefore, it is possible to reproduce the magnetization of the recording layer 3, i.e., signals recorded on the magnetic recording medium.

The above is the principle of the first signal reproduction method according to this invention. In this case, the area where the tunnel current flows is approximately equal to the area of the probe 1 which faces the magnetic recording medium. A high reproduction resolution is easily acquired by making the probe 1 thinner to reduce the area of the medium facing surface of the probe 1.

A description will now be given of preferred embodiments of a magnetic recording and reproducing apparatus based on the first signal reproduction method according to this invention.

First Embodiment

FIG. 5 presents a diagram showing the schematic structure of a magnetic recording and reproducing apparatus according to the first embodiment. A magnetic recording medium 11 has a soft magnetic layer 14, a perpendicular magnetic recording layer 13 and a non-magnetic layer 12 stacked on an unillustrated medium substrate in order. The distal end of a probe 15 comprised of a conductive ferromagnetic film contacts the magnetic recording medium 11. The easy-magnetization axis of the probe 15 is set in the lengthwise direction perpendicular to the surface of the magnetic recording medium 11. At least one of the perpendicular magnetic recording layer 13 and the soft magnetic layer 14 is electrically grounded, and the probe 15 is grounded via a series circuit of a current-detecting resistor 16 and a DC voltage source 17. An amplifier 18 is connected to both ends of the current-detecting resistor 16.

With this structure, when a DC voltage from the DC voltage source 17 is applied between the probe 15 and the perpendicular magnetic recording layer 3, the tunnel current flows between the probe 15 and the perpendicular magnetic recording layer 13. When the probe 15 and the magnetic recording medium are set substantially in contact with each other and are relatively moved in the lengthwise direction of the recording track indicated by the arrow A, the tunnel current changes in accordance with a change in the recording magnetization of the perpendicular magnetic recording layer 13. This change in tunnel current is detected as a voltage change which appears across the detecting resistor 16, and this voltage change is amplified by the amplifier 18 and is acquired as a reproduced signal.

As the non-conductive non-magnetic layer 12, a film of $Al_2O_3$, $Si_3N$, C (diamond) or the like as an insulating material can be used, and a film of a Ge system, Si system or the like as a semiconductor material can be used. A ferromagnetic film of a CoCr system, CoPt system, SmCo system can be used as the perpendicular magnetic recording layer 13, and a ferromagnetic film of a Fe system, Co system or the like can be used as the soft magnetic layer 14. A ferromagnetic film of a Fe, a Fe system, a Co system or the like can be used for the probe 15.

Since the linear resolution for signal reproduction is determined by the film thickness t of the probe 15 according to this embodiment, a high linear resolution can be acquired easily. If recording is accomplished with a sufficiently high density, a reproduction linear resolution of 400 to 500 kFCI can be obtained by setting the film thickness t to 50 nm or smaller, preferably 20 nm or smaller. The value of this reproduction linear resolution is five to ten times what is obtained by the prior art.

Because the probe 15 is significantly thin and has a simple structure, the probe 15 can be worked easily and at a high precision. It is thus very easy to design the probe 15 in the submicron order to provide narrow tracks and it is possible to increase the manufacturing yield of the reproducing element whose essential element is the probe 15.

If the distance between the probe 15 and the perpendicular magnetic recording layer 13 is set equal to or smaller than 10 nm and the resistance of the current-detecting resistor 16 is set to 100 Ω or smaller, and the voltage to be applied to the surface of the probe 15 which faces the magnetic recording medium 11 is so adjusted that the tunnel current density becomes equal to or greater than $1 \times 10^{11}$ [$A/m^2$], signal reproduction can be accomplished with a significantly high precision and a high signal-to-noise ratio over a high signal frequency band. This embodiment can therefore improve the areal recording density of the magnetic recording and reproducing apparatus significantly as compared with the prior art.

According to this embodiment, to avoid the unstable behavior of the reproduction signal output, it is desirable to take some measures such as giving a sufficient anisotropy so that the magnetization of the probe 15 is not disturbed by the signal magnetic field exerted from the magnetic recording medium 11.

Although the foregoing description of this embodiment has been given with reference to the perpendicular magnetic recording system, this invention can also be adapted to a longitudinal magnetic recording system or transverse magnetic recording system.

Second Embodiment

FIG. 6 is a diagram showing the essential structure of a magnetic recording and reproducing apparatus according to the second embodiment where an anti-ferromagnetic film 20 of FeMn, NiO, PtMn or the like or a hard magnetic film of a CoPt system, CoCr system or the like is stacked on the probe 15 to fix the magnetization of the probe 15 in a predetermined direction; the other structure is the same as that of the first embodiment. Reference numeral "21" denotes the surface (medium facing surface) of the head section which faces the magnetic recording medium.

This embodiment can prevent the magnetization of the probe 15 from becoming unstable by a change in the signal field which is applied to the probe 15 by the recording magnetization of the recording layer 13 at the time of signal reproduction. This can ensure stable signal reproduction with a high signal-to-noise ratio. While the magnetization of the probe 15 should be directed perpendicular to the surface of the magnetic recording medium in the perpendicular magnetic recording system in this embodiment, that magnetization may be fixed to any direction according to the recording system.

Third Embodiment

Figure 7A:
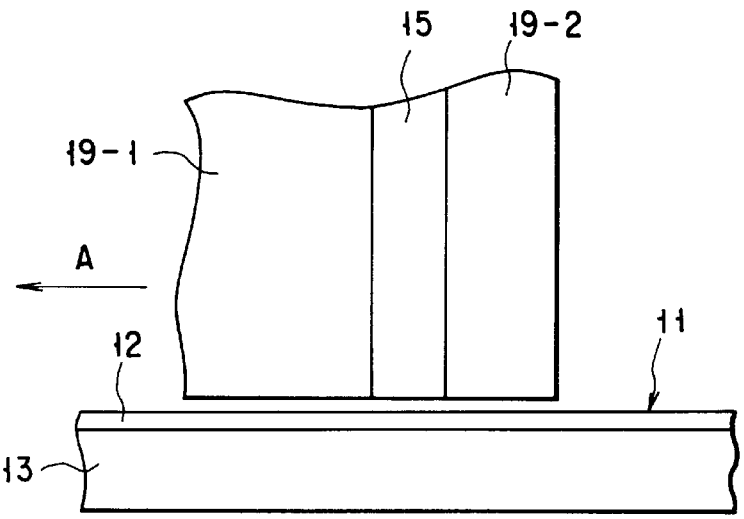
FIGS. 7A and 7B are cross-sectional views showing the essential structure of a magnetic recording and reproducing apparatus according to the third and ninth embodiments.
Figure 7B:
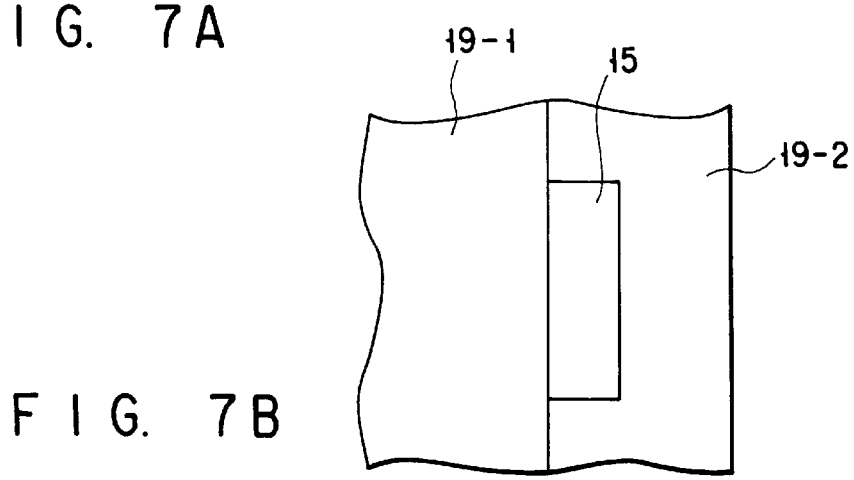

FIGS. 7A and 7B are diagrams showing the essential structure of a magnetic recording and reproducing apparatus according to the third embodiment; FIG. 7A is a cross-sectional view in the direction of the relative movement of the head and the magnetic recording medium, and FIG. 7B is a cross-sectional view of the reproducing element as viewed from the surface side of the magnetic recording medium. This embodiment is designed such that the probe 15, excluding the medium facing surface, is surrounded by non-magnetic insulating layers 19-1 and 19-2 of a material with a high thermal conductivity, such as $A_2O_3$, $Si_3N_4$ or C (diamond), and the other structure is the same as that of the first embodiment. This structure can allow a larger tunnel current to flow and can thus increase the signal reproduction output.

The anti-ferromagnetic film or hard magnetic film which has been discussed in the section of the first embodiment may be stacked on the probe 15, which may further be surrounded by a non-magnetic insulating layer.

Fourth Embodiment

Figure 8:
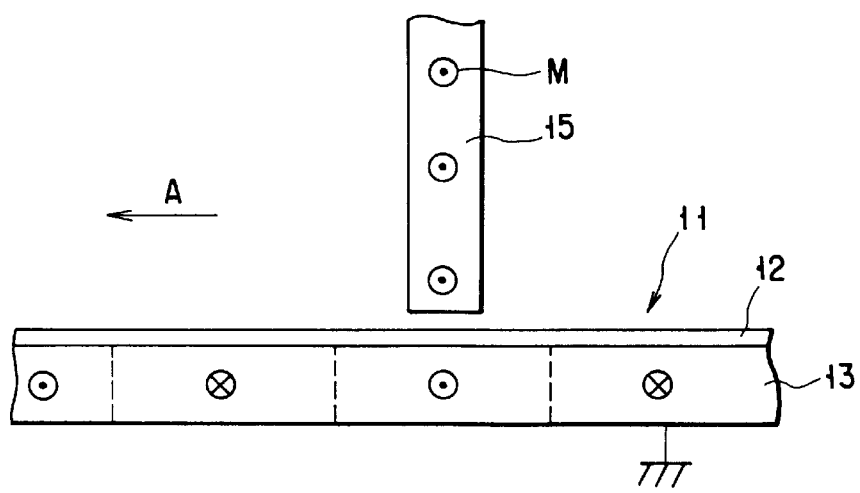
FIG. 8 is a cross-sectional view depicting the essential structure of a magnetic recording and reproducing apparatus according to the fourth embodiment.

FIG. 8 is a cross-sectional view along the direction of the relative movement of the head and the magnetic recording medium, showing the essential structure of a magnetic recording and reproducing apparatus according to the fourth embodiment. In this embodiment, the invention is adapted to the transverse magnetic recording system.

The magnetic recording medium 11 has the non-magnetic layer 12 stacked on the recording layer 13 having the recording magnetization formed in the transverse direction (the widthwise direction of the recording tracks). The probe 15 whose easy magnetization axis is set in the widthwise direction of the recording tracks) is positioned in contact with the magnetic recording medium 11 and is moved relative to the magnetic recording medium 11 in the direction of the arrow A for signal reproduction. This transverse magnetic recording system can also have the same advantages as obtained by the previously-discussed embodiments.

Fifth Embodiment

The fifth embodiment of this invention as adapted to a fixed magnetic disk apparatus will be discussed below with reference to FIGS. 9 through 11.

Figure 9:
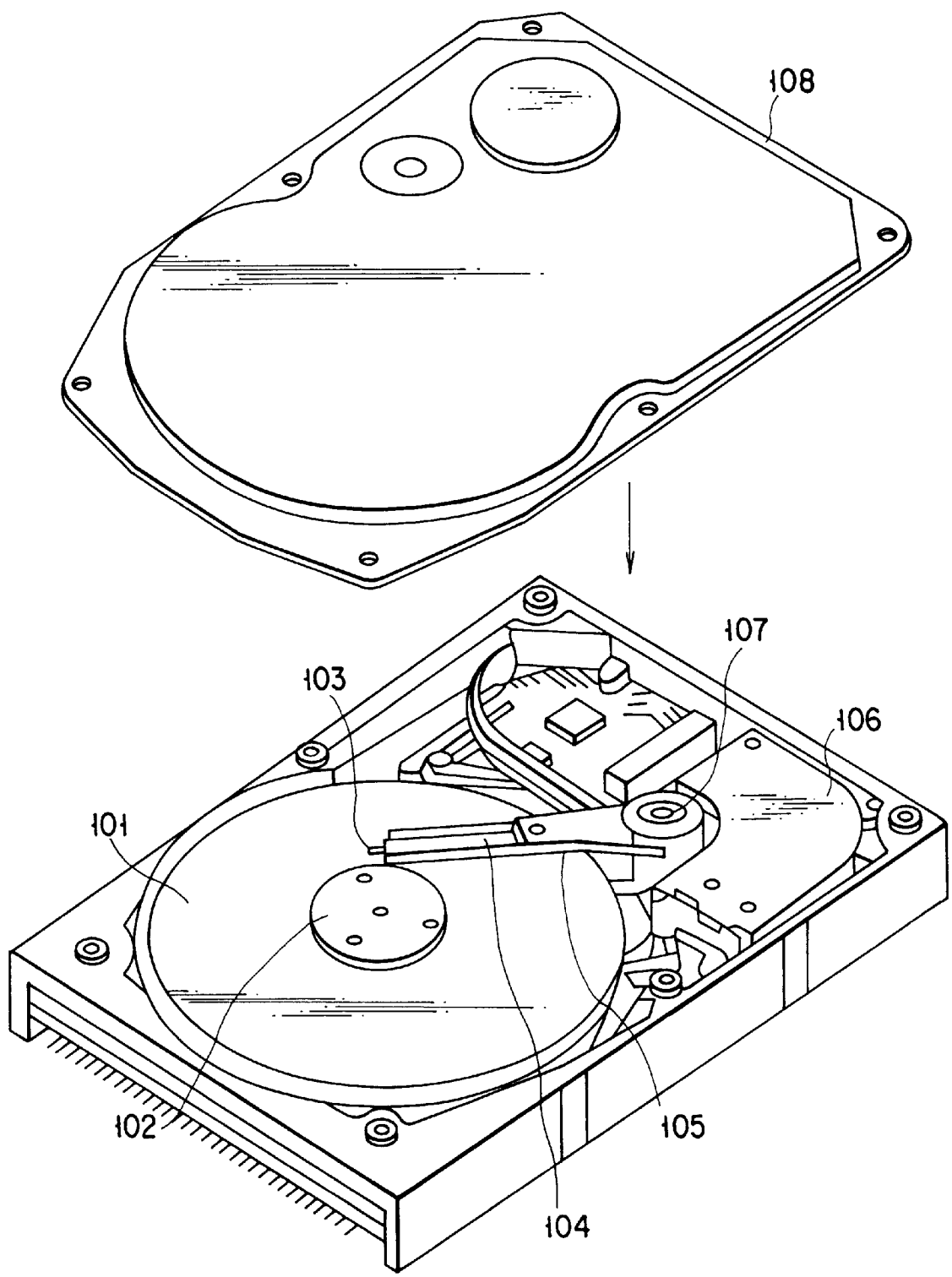
FIG. 9 is a perspective view illustrating the overall structure of a magnetic recording and reproducing apparatus according to the fifth embodiment.

As shown in FIG. 9, a disk-shaped magnetic recording medium (magnetic disk) 101 in a fixed magnetic disk apparatus according to this embodiment is rotated by a spindle motor 102. The head section which performs signal recording and reproduction on the magnetic disk 101 and comprises a recording element and a reproducing element including the probe that has been discussed in the sections of the previous embodiments is mounted on a head slider 103, which is supported by an arm 105 via a suspension 104. The arm 105 is supported on a fixed shaft 107 and is moved in the radial direction of the magnetic disk 101 by a voice coil motor 106, so that the head section is controlled to be positioned on the target track on the magnetic disk 101.

Figure 10:
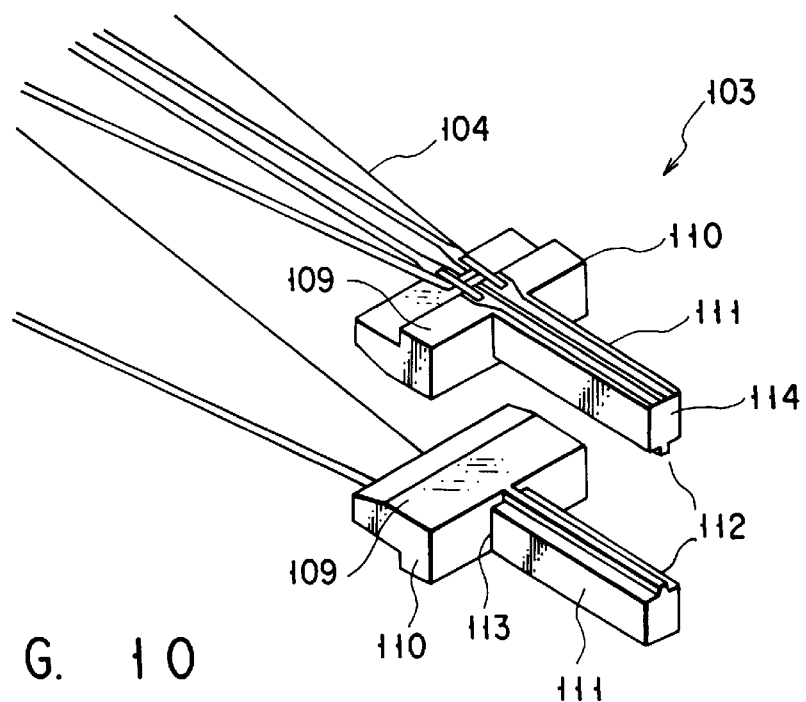
FIG. 10 is a diagram showing the structure of a head slider according to the fifth embodiment.

FIG. 10 is a perspective view showing the structure around the head slider 103 in enlargement. The head slider 103 comprises a slider section 110 and a rod-shaped head support 111 coupled to this slider section 110. The slider section 110 has a slider surface 109 facing the magnetic disk 101 so as to receive a hydrodynamic force generated by the dynamic effect of the flow of a gas like air which is caused by the rotation of the magnetic disk 101. The head support 111 has a contact portion 112 comprised of a projection formed on the surface of the head support 111 which faces the magnetic disk 101, a proximal end portion 113 coupled to the slider section 110 and a head-forming surface 114 located on the opposite end face to the slider section 111. The head section is formed on the head-forming surface 114 in such a manner that the opposing surface 21 to the magnetic disk 101 is positioned substantially on the same plane as the opposing surface of the contact portion 112 to the magnetic disk 101 and contacts the magnetic disk 101.

The head support 111 is so designed that its mass is smaller than that of the slider section 110 and the area of the opposing surface of the contact portion 112 to the magnetic disk 101 is smaller than the area of the slider surface 109.

FIGS. 11A and 11B are diagrams showing the specific structures of the recording element and the reproducing element which constitute the head section and are mounted on the head slider 103. As illustrated, the reproducing element including the probe 15 and the recording element including a ring-shaped thin film magnetic head are stacked on the head-forming surface 114 of the head support 111 of the slider section 110 by a thin film process. FIG. 11A shows the case where a reproducing element 200, which comprises the probe 15 and a non-magnetic insulating layer 201, is formed on the head-forming surface 114 of the head support 111, a recording element 203, which comprises a ring-shaped magnetic core 204, a recording coil 205 and an non-magnetic insulating layer 206 covering the former two is stacked on the reproducing element 200. FIG. 11B shows the case where the recording element 203 and the reproducing element 200 are stacked on the head-forming surface 114 of the head support 111 in the opposite order to the lamination order in FIG. 11A.

According to this embodiment, the reproducing element 200 having the probe 15 as the essential element and the recording element 203 can stably and reliably run in contact with the magnetic disk 101. At the time of signal reproduction, therefore, a spacing-variation originated change in the tunnel current which flows between the probe 15 and the magnetic disk 101 becomes considerably smaller, thus ensuring stable signal reproduction with a high signal-to-noise ratio.

If a perpendicular magnetization recording medium is used, a unipolar type recording element may be used.

Sixth Embodiment

Figure 12:
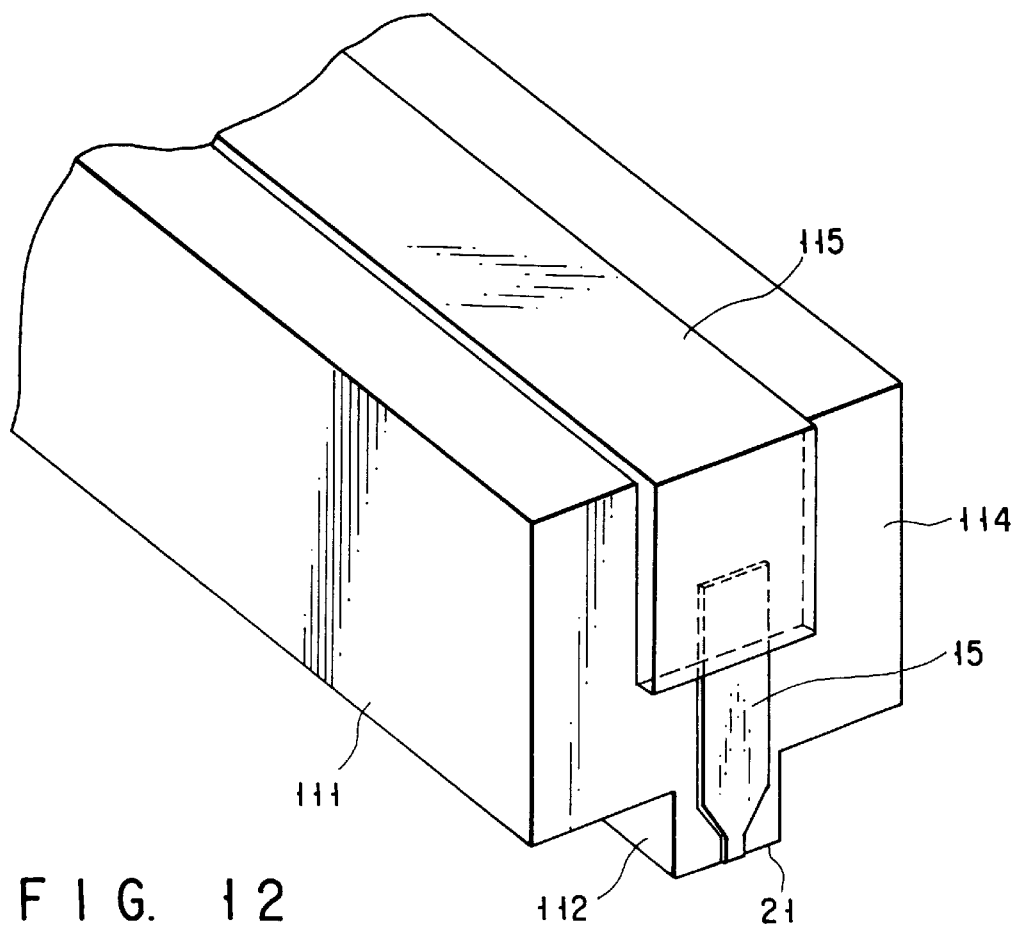
FIG. 12 is a perspective view illustrating the essential structure of a magnetic recording and reproducing apparatus according to the sixth and twelfth embodiments.

FIG. 12 is a perspective view illustrating the essential structure of a magnetic recording and reproducing apparatus according to the sixth embodiment. The probe 15 is designed narrower in the vicinity of the medium facing surface 21 and wider than the reproduction track width (the probe's narrow width) at the deep portion of the head, with a thin film lead 115 with a good conductivity stacked on the probe 15 at the deep head portion. The thin film lead 115 contacts the probe 15 on the head-forming surface 114 of the head support Ill and extends from the head-forming surface 114 to the opposite surface to the contact portion 112. The opposite end of the thin film lead 115 to the probe 15 is connected to the current-detecting resistor 16 shown in FIG. 5. In FIG. 12, the recording element and its lead are omitted.

According to this embodiment, the described shape of the probe 15 reduces the overall electrical resistance of the probe 15 in addition to which the density of the current flowing through the probe 15 is smaller at the deep head portion than in the vicinity of the medium facing surface 21. It is thus possible to suppress the total heat generated by the probe 15. Consequently, a larger tunnel current can flow through the probe 15, so that a larger reproduction signal output can be obtained.

Seventh Embodiment

Figure 13:
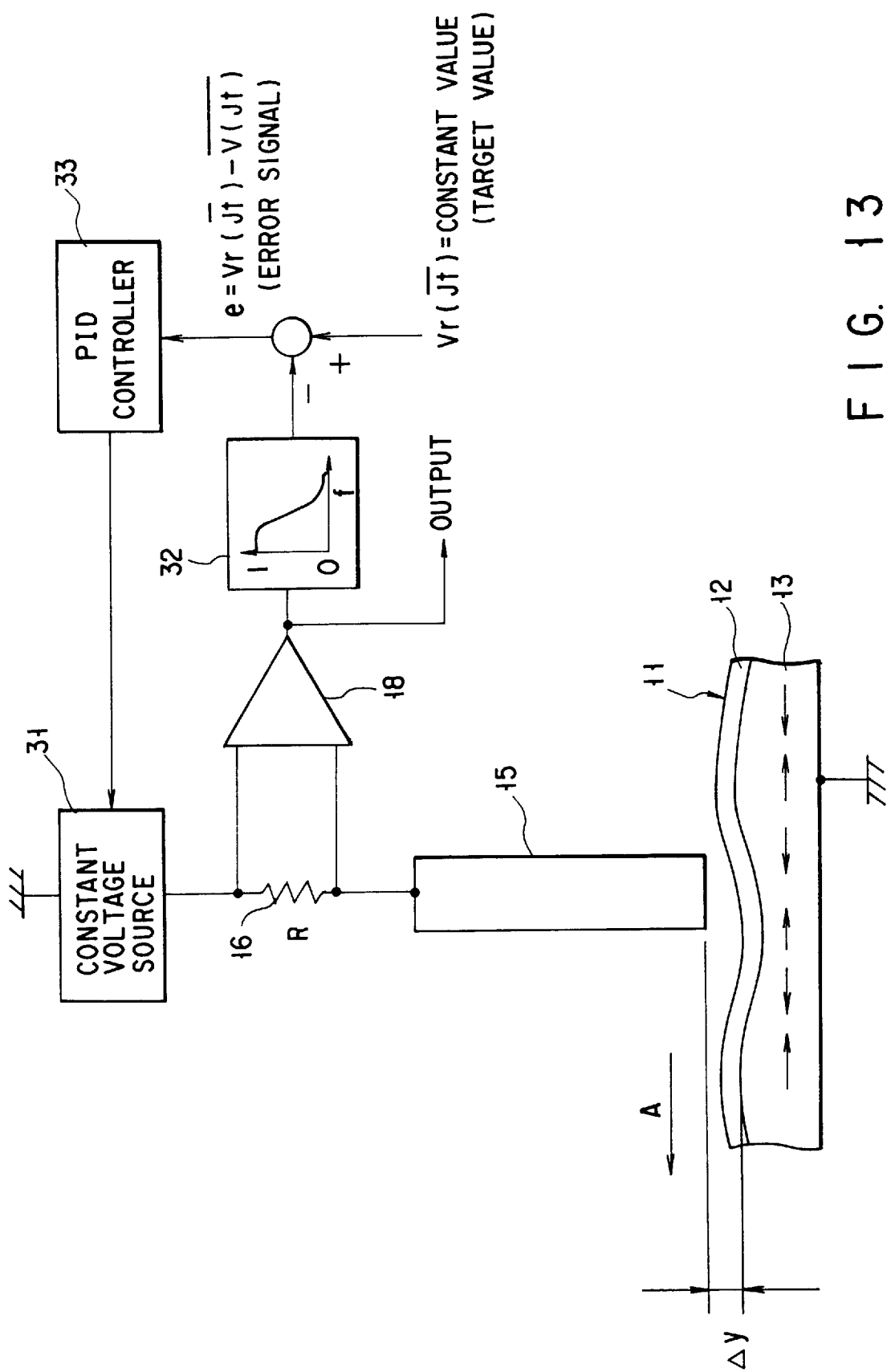
FIG. 13 is a block diagram depicting the structure of a magnetic recording and reproducing apparatus according to the seventh embodiment.

FIG. 13 is a block diagram of a magnetic recording and reproducing apparatus according to the seventh embodiment which is designed to prevent the tunnel current from varying in accordance with the surface fluctuation or surface undulation of the magnetic recording medium 11.

In this embodiment, a voltage-controllable constant voltage source 31 is used as a DC voltage source. The voltage across the current-detecting resistor 16 is amplified by the amplifier 18 and is then supplied to a low-pass filter 32. The difference (error) between the output signal of this low-pass filter 32 and the target signal, which is the voltage appearing across the current-detecting resistor 16 when a predetermined target tunnel current flows, is obtained and this difference is input to a PID (Proportional Integral and Derivative) controller 33. The DC voltage to be output from the constant voltage source 31 is controlled by the output signal of the PID controller 33 to keep the tunnel current constant.

The surface fluctuation or surface undulation of the magnetic recording medium 11, if present, greatly varies the tunnel current so that a prominent change occurs in the reproduced signal. However, the periods of the surface fluctuation and surface undulation can be considered sufficiently larger than the actual maximum period of signals recorded on the magnetic recording medium 11. What is more, the structure of this embodiment can accomplish significantly stable and accurate signal reproduction in the range where the amplitude variation ($\Delta y$) of the fluctuation or undulation does not affect the degree of modulation of the tunnel current caused by the magnetic tunnel phenomenon.

The second signal reproduction method according to this invention will now be described with reference to FIGS. 14A through 14D.

Figure 14A:
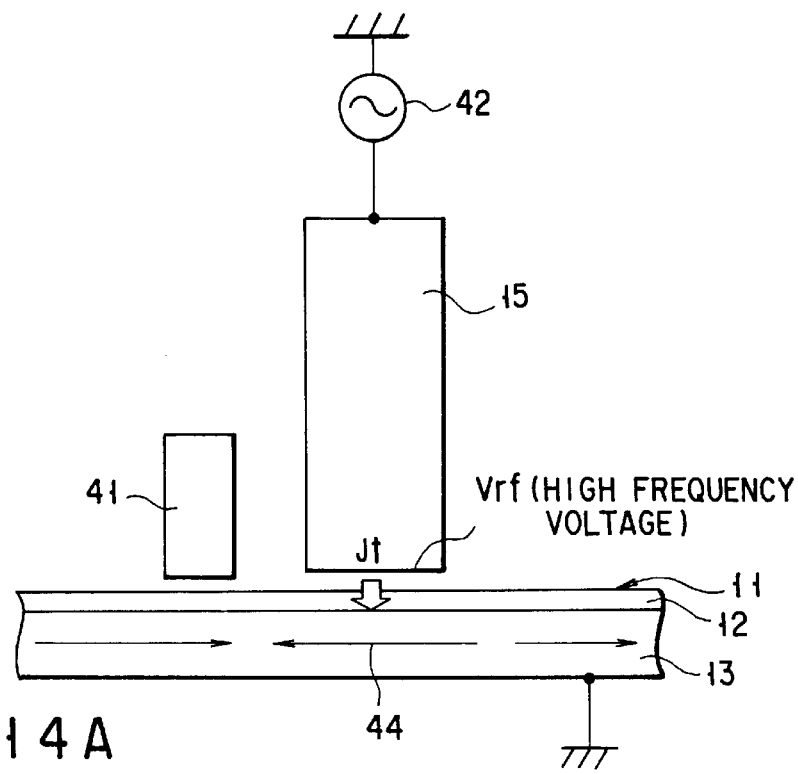
FIGS. 14A through 14D are diagrams for explaining the second signal reproduction method according to this invention.

As shown in FIG. 14A, the very thin (about 10 nm) non-conductive non-magnetic layer 12 is formed on a recording layer 13, forming the magnetic recording medium 11 as per the first embodiment. The probe 15 comprised of a conductive ferromagnetic film is positioned above this magnetic recording medium 11 with its distal end facing the magnetic recording medium 11 in such a way that the probe 15 is in contact or nearly in contact with this magnetic recording medium. When a predetermined high-frequency voltage Vrf is applied between the probe 15 and the recording layer 13, a tunnel current flows between the probe 15 and the recording layer 13 through the non-magnetic layer 12. The non-conductive non-magnetic layer 12 may be an insulator or a semiconductor layer.

Figure 14B:
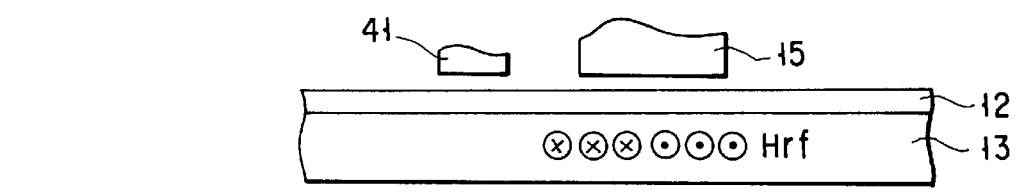
Figure 14C:
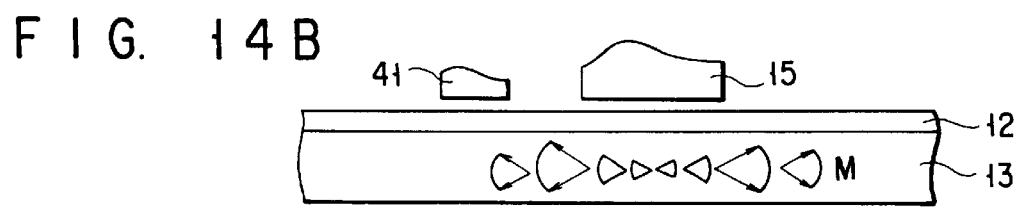

This tunnel current generates a high-frequency magnetic field Hrf as shown in FIG. 14B, which is applied to recording magnetization 44 of the recording layer 13 directly under the probe 15. If the frequency f of the high-frequency voltage Vrf is set so that the recording magnetization 44 causes ferromagnetic resonance and the probe 15 is moved in the longitudinal direction of the recording tracks relative to the magnetic recording medium 11, the ferromagnetic resonance condition changes in accordance with a change in the recording magnetization 44. When ferromagnetic resonance occurs, the recording magnetization 44 takes a precession in the recording layer 13 as indicated by the symbol "M" in FIG. 14C to realize high-frequency magnetization.

Figure 14D:
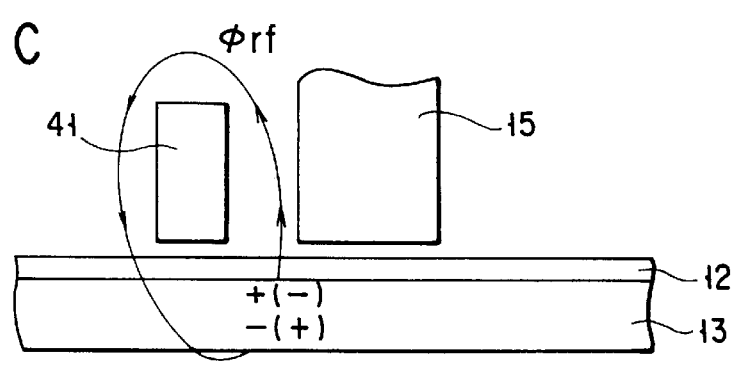

When a detection coil 41 is placed near the probe 15, a high-frequency flux $\phi$rf produced from the high-frequency magnetization which is generated by the recording magnetization 44 crosses the detection coil 41, as shown in FIG. 14D, thus generating a high-frequency induced electromotive force across the detection coil 41. Since this induced electromotive force is modulated by a change in the recording magnetization 44, signals recorded on the magnetic recording medium can be reproduced by amplifying this induced electromotive force or the output signal of the detection coil 41 and then detecting the amplified signal (e.g., peak detection).

The above is the principle of the second signal reproduction method according to this invention. In general, the ferromagnetic resonance frequency of the recording magnetization 44 is very high, several gigahertz to 20 gigahertz. Even if the high-frequency flux $\phi$rf itself is small, therefore, a large induced electromotive force is produced in proportional to the level of that frequency so that a sufficiently large reproduction signal output can be obtained.

Further, the ferromagnetic resonance is produced only by the recording magnetization 44 directly under the probe 15. As the induced electromotive force originated from this ferromagnetic resonance is detected to reproduce signals, the linear resolution in the reproduction mode is substantially determined by the thickness of the probe 15 in the longitudinal direction of the recording tracks alone. This means that a significantly large linear resolution (linear recording density) is obtainable.

Embodiments of a magnetic recording and reproducing apparatus based on the above-described second signal reproduction method will be discussed below.

Eighth Embodiment

FIG. 15 is a diagram showing the schematic structure of a magnetic recording and reproducing apparatus according to the eighth embodiment. The magnetic recording medium 11 has the recording layer 13 and the non-magnetic layer 12 stacked in order on the medium substrate 10. The conductive probe 15 is in contact with the magnetic recording medium 11. The recording layer 13 is electrically grounded, and the probe 15 is grounded via a high-frequency voltage source (high-frequency oscillator) 42.

The detection coil 41 formed of a conductive film is located close to the probe 15. Connected to both ends of the detection coil 41 is an amplifier 45 whose output signal is input to a detector 46. The same materials as used in the first embodiment are also selected for non-magnetic layer 12, the recording layer 13 and the probe 15 in this embodiment.

With this structure, when the high-frequency voltage from the high-frequency voltage source 42 is applied between the probe 15 and the recording layer 13, a high-frequency tunnel current flows between the probe 15 and the recording layer 13 through the non-magnetic layer 12. As the probe 15 is made to substantially contact the magnetic recording medium 11 and both are relatively moved in the longitudinal direction of the recording tracks indicated by the arrow A, the high-frequency magnetic field Hrf is generated by the high-frequency tunnel current Irf which flows directly under the probe 15 in accordance with a change in the recording magnetization 44 of the recording layer 13, and this high-frequency magnetic field Hrf is applied to the recording magnetization 44 of the recording layer 13 located directly below the probe 15.

As a result, the recording magnetization 44 causes ferromagnetic resonance. When the ferromagnetic resonance occurs, the recording magnetization 44 takes a precession which causes high-frequency magnetization. When the detection coil 41 formed of a conductive film is positioned close to the probe 15, therefore, the high-frequency flux $\phi$rf generated by the high-frequency magnetization crosses the detection coil 41, thus producing high-frequency induced electromotive force in the detection coil 41.

If the frequency of the high-frequency voltage is fixed in such a way that ferromagnetic resonance occurs in the area in the recording layer 13 where recording magnetization is formed uniformly and no ferromagnetic resonance occurs in the magnetization reversal area, the recording magnetization 44 directly under the probe 15 is changed by the relative movement of the magnetic recording medium 11 and the probe 15, causing the induced electromotive force produced in the detection coil 41 to change. As this change in induced electromotive force or the output signal of the detection coil 41 is amplified by the amplifier 45 and the amplified signal is detected by the detector 46, recorded signals can be reproduced with a high precision. The detector 46 basically takes any structure such as the peak detection type.

This embodiment can also provide the same advantages as obtained by the first embodiment. In addition, the probe 15 and the detection coil 41 are so arranged as to electromagnetically perpendicular to each other and the high-frequency magnetic field based on the high-frequency current (equivalent to the high-frequency tunnel current) flowing through the probe 15 can be made not to cross the detection coil 41 in this embodiment, the detection coil 41 can detect only a change in the high-frequency flux according to a change in recording magnetization. This ensures highly accurate and high-quality signal reproduction.

Although the foregoing description of this embodiment has been given with reference to the longitudinal recording system, this invention can also be adapted to the vertical recording system or horizontal recording system.

Ninth Embodiment

This embodiment, like the third embodiment described referring to FIGS. 7A and 7B, is designed such that the probe 15 is surrounded by non-magnetic insulating layers of a material with a high thermal conductivity, such as $Al_2O_3$, $Si_3N_4$ or C (diamond). This structure can allow a larger tunnel current to flow and can thus increase the signal reproduction output.

Tenth Embodiment

FIGS. 16A and 16B are diagrams showing the structure of a magnetic recording and reproducing apparatus according to the tenth embodiment. As illustrated, the probe 15 comprises two conductive films 15-1 and 15-2 arranged near the medium facing surface 21 in parallel to each other with a predetermined gap therebetween along the head-medium moving direction (longitudinal direction of the recording tracks) indicated by the arrow A. Those conductive films 15-1 and 15-2 are electrically connected together in a deep head portion 47 away from the vicinity of the medium facing surface 21. Located between the two conductive films 15-1 and 15-2 in the vicinity of the medium facing surface 21 is the detection coil 41 which is electrically insulated from the probe 15 by an insulator 48. The other structure is the same as that of the eighth embodiment.

Since the two conductive films 15-1 and 15-2 constituting the probe 15 are arranged in front and at the back of the detection coil 41 in the longitudinal direction of the recording tracks in this embodiment, this embodiment has the following advantage in addition to the advantages of the eighth embodiment. The high-frequency tunnel currents in two paths which flow directly under the two conductive films 15-1 and 15-2 can permit a stronger high-frequency magnetic field and sharper in the direction of the linear resolution to be applied to the recording magnetization 44 of the recording layer 13, located directly under the detection coil 41. It is therefore possible to ensure signal reproduction with a higher precision and a higher linear resolution.

Eleventh Embodiment

According to this embodiment, like the fifth embodiment discussed with reference to FIGS. 9 through 11, the present invention is adapted to a fixed magnetic disk apparatus. The general structure of the fixed magnetic disk apparatus of this embodiment is the same as that shown in FIG. 9 and the structure of the head slider 103 in this embodiment is likewise same as that shown in FIG. 10.

FIG. 17 is a perspective view depicting the structure of the reproducing element on the head support 111 in this embodiment. The probe 15 of a conductive film, the detection coil 41, which is electrically insulated from the probe 15 and is arranged to be electromagnetically perpendicular to the probe 15, the thin film lead 115 connected to the probe 15, and a pair of thin film leads 116-1 and 116-2 connected to both ends of the detection coil 41 are formed on the head-forming surface 114 of the head support 111 by a thin film process. The thin film leads 115, 116-1 and 116-2 contact the probe 15 and both ends of the detection coil 41 on the head-forming surface 114 of the head support 111 and extend from the head-forming surface 114 to the opposite surface to the contact portion 112. The opposite end of the thin film lead 115 to the probe 15 is connected to the high-frequency voltage source 42 shown in FIG. 15, and the opposite ends of the thin film leads 116-1 and 116-2 to the detection coil 41 are connected to the amplifier 45 shown in FIG. 15. In FIG. 17, the recording element and its lead are omitted.

FIGS. 18A and 18B are diagrams showing the specific structures of the recording element and the reproducing element which constitute the head section and are mounted on the head slider 103 in this embodiment. As illustrated, the reproducing element, which includes the probe 15, the non-magnetic insulating layer 201 and the detection coil 41 placed between the probe 15 and the non-magnetic insulating layer 201 with a thin non-magnetic insulating layer 202 in between, and the recording element including a ring-shaped thin film magnetic head are stacked on the head-forming surface 114 of the head support 111 of the slider section 110 by a thin film process.

FIG. 18A shows the case where the reproducing element 200, which comprises the probe 15, the detection coil 41 and the non-magnetic insulating layers 201 and 202, is formed on the head-forming surface 114 of the head support 111, the recording element 203, which comprises the ring-shaped magnetic core 204, the recording coil 205 and the non-magnetic insulating layer 206 covering the former two is stacked on the reproducing element 200. FIG. 18B shows the case where the recording element 203 and the reproducing element 200 are stacked on the head-forming surface 114 of the head support 111 in the opposite order to the lamination order in FIG. 18A.

In this embodiment too, as shown in FIG. 10, the head slider 103 comprises a slider section 110 and a rod-shaped head support 111 coupled to this slider section 110, and the slider section 110 has a slider surface 109 facing the magnetic disk 101 so as to receive a hydrodynamic force generated by the dynamic effect of the flow of a gas like air which is caused by the rotation of the magnetic disk 101. The head support 111 has a contact portion 112 comprised of a projection formed on the surface of the head support 111 which faces the magnetic disk 101, a proximal end portion 113 coupled to the slider section 110 and a head-forming surface 114 located on the opposite end face to the slider section 111. The head section is formed on the head-forming surface 114 in such a manner that the opposing surface 21 to the magnetic disk 101 is positioned substantially on the same plane as the opposing surface of the contact portion 112 to the magnetic disk 101 and contacts the magnetic disk 101. The head support 111 is so designed that its mass is smaller than that of the slider section 110 and the area of the opposing surface of the contact portion 112 to the magnetic disk 101 is smaller than the area of the slider surface 109.

According to this embodiment, with the above-described structure, the reproducing element 200 having the probe 15 and the detection coil 41 as the essential elements and the recording element 203 can stably and reliably run in contact with the magnetic disk 101. At the time of signal reproduction, therefore, a spacing-variation originated change in the high-frequency tunnel current which flows to the magnetic disk 101 from the probe 15 becomes considerably smaller, thus ensuring stable signal reproduction with a high signal-to-noise ratio.

If a perpendicular magnetization recording medium is used, a single-pole type recording element may be used.

Twelfth Embodiment

This embodiment, like the sixth embodiment which has been discussed referring to FIG. 12, designs the probe 15 narrower in the vicinity of the medium facing surface 21 and wider than the reproduction track width (the probe's narrow width) at the deep portion of the head, with a thin film lead with a good conductivity stacked on the probe 15 at the deep head portion.

The advantages of this embodiment, like those of the sixth embodiment, the overall electrical resistance of the probe 15 becomes smaller in addition to which the density of the current flowing through the probe 15 is smaller at the deep head portion than in the vicinity of the medium facing surface 21. It is thus possible to suppress the total heat generated by the probe 15. Consequently, a larger tunnel current can flow through the probe 15, so that a larger reproduction signal output can be obtained.

Thirteenth Embodiment

Figure 19:
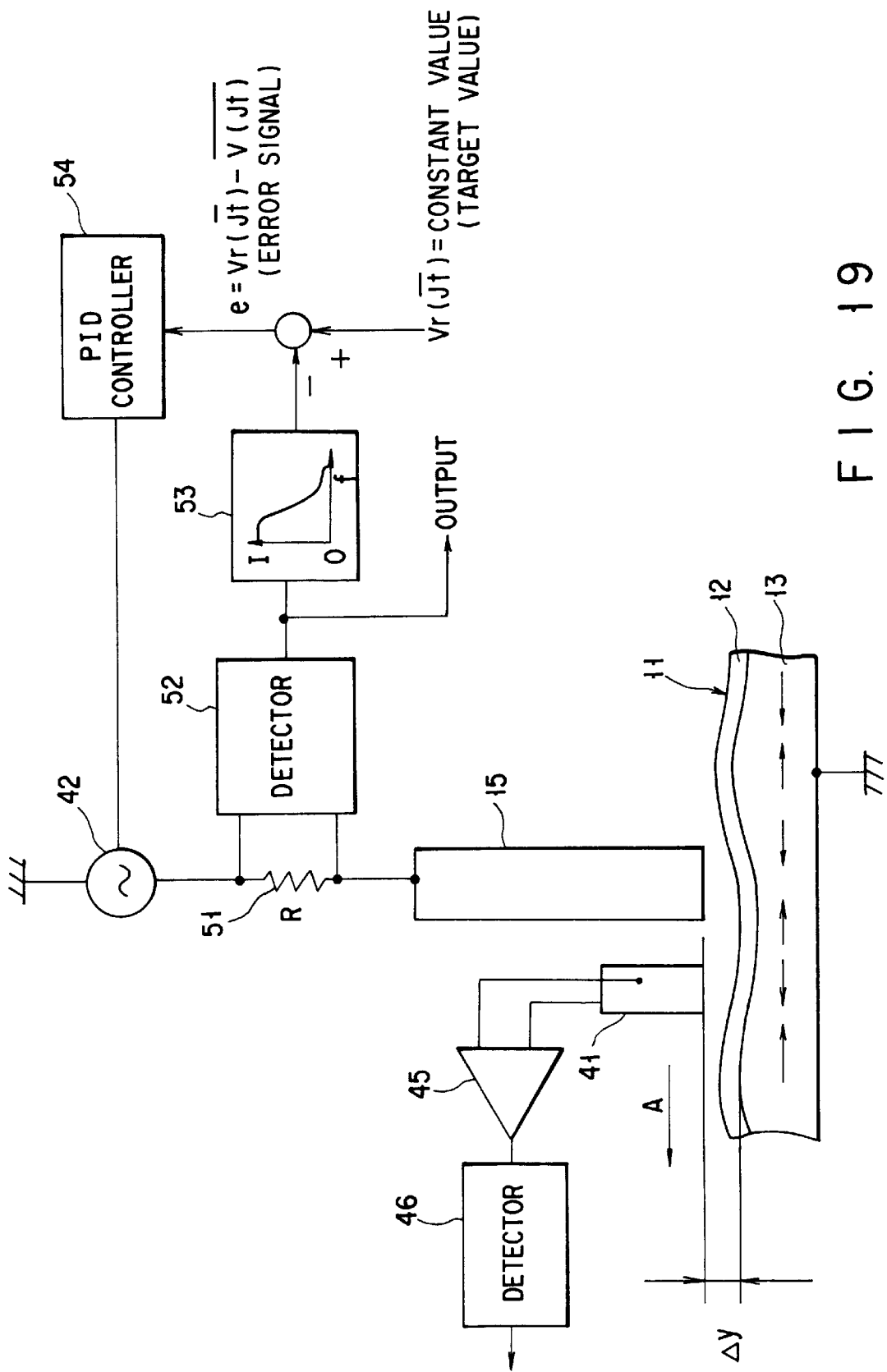
FIG. 19 is a block diagram depicting the structure of a magnetic recording and reproducing apparatus according to the thirteenth embodiment.

FIG. 19 is a block diagram of a magnetic recording and reproducing apparatus according to the thirteenth embodiment which, like the seventh embodiment discussed above referring to FIG. 13, is designed to prevent the tunnel current from varying in accordance with the surface fluctuation or surface undulation of the magnetic recording medium 11.

In this embodiment, a high-frequency current-detecting resistor 51 is intervened between the probe 15 and the high-frequency voltage source 42, and the high-frequency voltage across this resistor 51 is detected by a detector 52 (e.g., a peak detector) and is then input to a low-pass filter 53. The difference (error) between the output signal of this low-pass filter 53 and the target signal, which is the voltage appearing across the high-frequency current-detecting resistor 51 when a predetermined target tunnel current flows, is obtained and this difference is input to a PID controller 54. The output voltage of the high-frequency voltage source 42 is controlled by the output signal of the PID controller 54 to keep the high-frequency tunnel current constant.

The surface fluctuation or surface undulation of the magnetic recording medium 11, if present, significantly changes the tunnel current so that a prominent change occurs in the reproduced signal. However, the periods of the surface fluctuation and surface undulation can be considered sufficiently larger than the actual maximum period of signals recorded on the magnetic recording medium 11. Moreover, the structure of this embodiment can accomplish significantly stable and accurate signal reproduction in the range where the amplitude variation ($\Delta y$) of the fluctuation or undulation does not affect the degree of the aforementioned ferromagnetic resonance.

The third signal reproduction method according to this invention and embodiments of a magnetic recording and reproducing apparatus which operates based on this method will now be described with reference to FIGS. 20 and 21.

As shown in FIG. 20, when the very thin (about 10 nm) non-conductive non-magnetic layer 12 is formed on the recording layer 13, forming a magnetic recording medium, the probe 15 comprised of a conductive ferromagnetic film is positioned above this magnetic recording medium with its distal end facing the magnetic recording medium in such a way that the probe 15 is in contact or substantially in contact with this magnetic recording medium, and a DC current source 61 is connected to this probe 15, a tunnel current Jt whose value is the same as the value of the current from the constant current source 61 flows between the probe 15 and the recording layer 13 through the non-magnetic layer 12. The non-conductive non-magnetic layer 12 may be an insulator or a semiconductor layer. FIG. 2 shows the relation between this tunnel current density Jt and the applied voltage V which is applied to the probe 15 by the constant current source 61.

With the applied voltage V set constant, the tunnel current Jt density Jt changes in accordance with the angle $\theta$ defined by the magnetization of the probe 15 and the magnetization of the recording layer 13. As this angle $\theta$ varies, therefore, the electric resistance Rt (or its reciprocal; the electric conductance Gt) of the non-magnetic layer 12 changes too as shown in FIG. 3 to cause the magnetic tunnel effect as per the first signal reproduction method discussed earlier. Generally, this electric resistance Rt becomes minimum when the magnetization of the probe 15 and the magnetization of the recording layer 13 are parallel ($\theta=0°$ or $360°$) and becomes maximum when those magnetizations are anti-parallel ($\theta=180°$).

As the probe 15 is moved relative to the magnetic recording medium which has recording magnetization formed on the recording layer 13 while contacting the magnetic recording medium and a constant current is supplied to the probe 15 from the constant current source 61, the voltage V produced between the probe 15 and the recording layer 13 (the voltage drop caused by the resistor Rt) changes by $\Delta V$ in accordance with the recording magnetization of the recording layer 13 as shown in FIG. 21. By detecting this voltage change $\Delta V$, therefore, it is possible to reproduce the magnetization of the recording layer 13, i.e., signals recorded on the magnetic recording medium.

The above is the principle of the third signal reproduction method according to this invention. In this case, the area where the tunnel current flows is approximately equal to the area of the probe 15 which faces the magnetic recording medium. A high reproduction resolution is easily acquired by making the probe 15 thinner to reduce the area of the medium facing surface of the probe 15.

The magnetic tunnel effect occurs when the distance d between the probe 15 and the recording layer 13 is in range of $0<d \leq 50$ nm. Further, a change $\Delta R/R$ in the electric resistance between the probe 15 and the recording layer according to the angle $\theta$, defined by the magnetization of the probe 15 and the magnetization of the recording layer 13, is approximately constant when the distance d between the probe 15 and the recording layer 13 falls in the aforementioned range. If the magnetization of the probe 15 is fixed and a constant tunnel current is permitted to flow between the probe 15 and the recording layer 13 by the constant current source 61, therefore, the voltage change $\Delta V$ between the probe 15 and the recording layer according to a change in the magnetization recorded on the recording layer 13 can be detected stably without being affected by a variation in d as long as this variation in d.

FIG. 20 illustrates the schematic structure of a magnetic recording and reproducing apparatus which operates based on the third signal reproduction, and is fundamentally the same as the first embodiment shown in FIG. 5 except for the use of the constant current source 61. The magnetic recording medium 11 has the soft magnetic layer 14, the perpendicular magnetic recording layer 13 and the non-magnetic layer 12 stacked on the unillustrated medium substrate in order. The distal end of the probe 15 comprised of a conductive ferromagnetic film contacts the magnetic recording medium 11. The easy-magnetization axis of the probe 15 is set in the longitudinal direction perpendicular to the surface of the magnetic recording medium 11. At least one of the perpendicular magnetic recording layer 13 and the soft magnetic layer 14 is electrically grounded. The constant current source 61 and the amplifier 62 are connected to the probe 15.

With this structure, when a constant DC current from the constant current source 61 is supplied to the probe 15, the tunnel current whose value is the same as that of the current from the constant current source 61 flows between the probe 15 and the perpendicular magnetic recording layer 3. When the probe 15 and the magnetic recording medium are set substantially in contact with each other and are relatively moved in the longitudinal direction of the recording track indicated by the arrow A, the electric resistance Rt between the probe 15 and the recording layer 13 changes in accordance with a change in the recording magnetization of the perpendicular magnetic recording layer 13. Accordingly, the voltage between the probe 15 and the recording layer 13 changes. This voltage change is amplified by the amplifier 62 and is acquired as a reproduced signal.

As the non-conductive non-magnetic layer 12, a film of $Al_2O_3$, $Si_3N$, C (diamond) or the like as an insulating material can be used, and a film of a Ge system, Si system or the like as a semiconductor material can be used. A ferromagnetic film of a CoCr system, CoPt system, SmCo system can be used as the perpendicular magnetic recording layer 13, and a ferromagnetic film of a Fe system, Co system or the like can be used as the soft magnetic layer 14. A ferromagnetic film of a Fe, a Fe system, a Co system or the like can be used for the probe 15.

Since the linear resolution for signal reproduction is determined by the film thickness t of the probe 15 according to this embodiment, a high linear resolution can be acquired easily. If recording is accomplished with a sufficiently high density, a reproduction linear resolution of 400 to 500 kFCI can be obtained by setting the film thickness t to 50 nm or smaller, preferably 20 nm or smaller. The value of this reproduction linear resolution is five to ten times what is obtained by the prior art.

Because the probe 15 is significantly thin and has a simple structure, the probe 15 can be worked easily and at a high precision. It is thus very easy to design the probe 15 in the submicron order to provide narrow tracks and it is possible to increase the manufacturing yield of the reproducing element whose essential element is the probe 15.

If the distance between the probe 15 and the perpendicular magnetic recording layer 13 is set equal to or smaller than 10 nm and the resistance of the current-detecting resistor 16 is set to 100 Ω or smaller, and the voltage to be applied to the surface of the probe 15 which faces the magnetic recording medium 11 is so adjusted that the tunnel current density becomes equal to or greater than $1 \times 10^{11}$ [A/m$^2$], signal reproduction can be accomplished with a significantly high sensitivity and a high signal-to-noise ratio over a high signal frequency band. This embodiment can therefore improve the surface recording density of the magnetic recording and reproducing apparatus significantly as compared with the prior art.

According to this embodiment, to avoid the unstable behavior of the reproduction signal output, it is desirable to take some measures such as giving a sufficient anisotropy so that the magnetization of the probe 15 is not disturbed by the signal magnetic field exerted from the magnetic recording medium 11.

Although the foregoing description of this embodiment has been given with reference to the perpendicular magnetic recording system, this invention can also be adapted to a longitudinal magnetic recording system or transverse magnetic recording system.

Figure 22A:
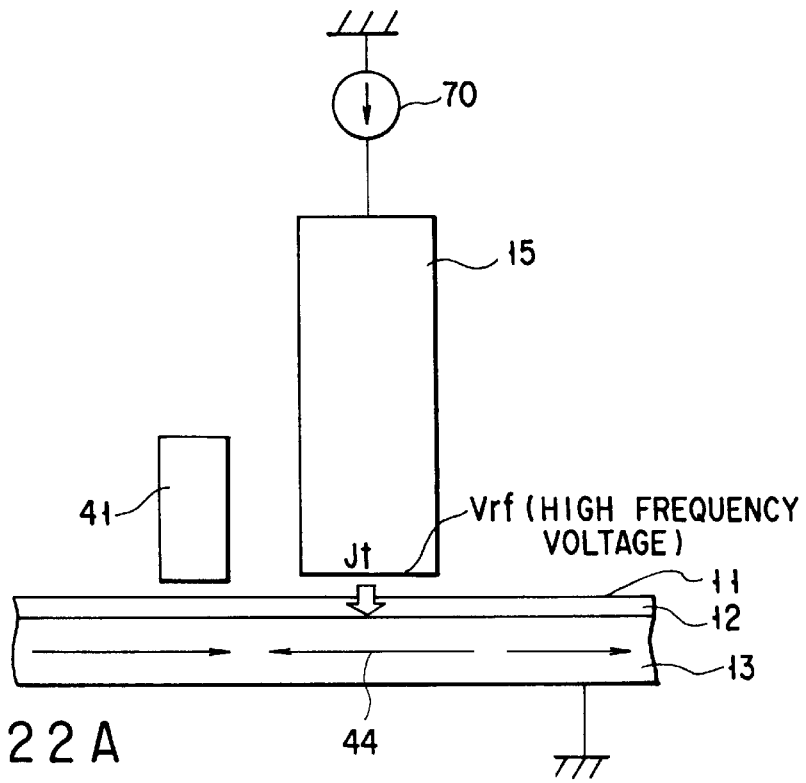
FIGS. 22A through 22D are diagrams for explaining the fourth signal reproduction method according to this invention.

The fourth signal reproduction according to this invention will now be explained referring to FIGS. 22A to 22D. This fourth signal reproduction is basically the same as the second signal reproduction which has been discussed referring to FIG. 14 but differs in the use of a high-frequency constant current source 70 in place of the high-frequency voltage source 42. As shown in FIG. 22A, the very thin (about 10 nm) non-conductive non-magnetic layer 12 is formed on the recording layer 13, forming a magnetic recording medium 11, and the probe 15 comprised of a conductive ferromagnetic film is positioned above this magnetic recording medium 11 with its distal end facing the magnetic recording medium 11 in such a way that the probe 15 is in contact or nearly in contact with this magnetic recording medium. When the high-frequency constant current source 70 is connected to the probe 15 to permit a predetermined high-frequency current to flow to the probe 15, a high-frequency constant tunnel current flows between the probe 15 and the recording layer 13 through the non-magnetic layer 12. The non-conductive non-magnetic layer 12 may be an insulator or a semiconductor layer.

Figure 22B:
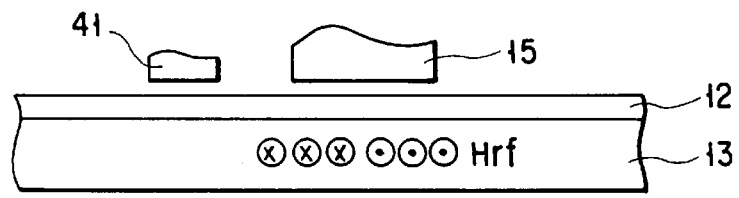
Figure 22C:
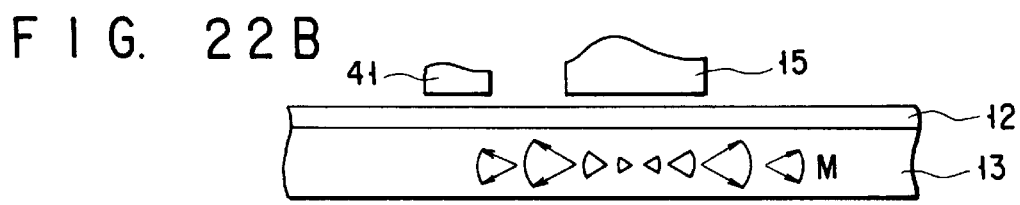

This high-frequency constant tunnel current generates a high-frequency magnetic field Hrf as shown in FIG. 22B, which is applied to recording magnetization 44 of the recording layer 13 directly under the probe 15. If the frequency f of the high-frequency current supplied from the high-frequency current source 70 is set so that the recording magnetization 44 causes ferromagnetic resonance and the probe 15 is moved in the longitudinal direction of the recording tracks relative to the magnetic recording medium 11, the ferromagnetic resonance condition changes in accordance with a change in the recording magnetization 44. When ferromagnetic resonance occurs, the recording magnetization 44 takes a precession in the recording layer 13 as indicated by the symbol "M" in FIG. 22C to realize high-frequency magnetization.

Figure 22D:
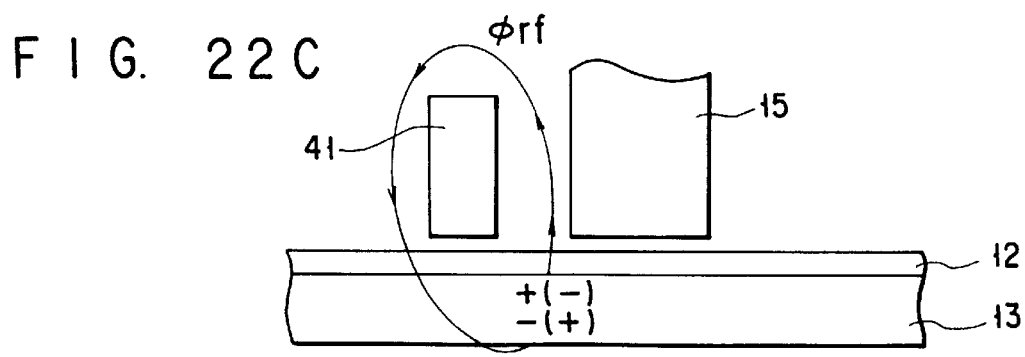

When a detection coil 41 is placed near the probe 15, a high-frequency flux φrf produced from the high-frequency magnetization which is generated by the recording magnetization 44 crosses the detection coil 41, as shown in FIG. 22D, thus generating a high-frequency induced electromotive force across the detection coil 41. Since this induced electromotive force is modulated by a change in the recording magnetization 44, signals recorded on the magnetic recording medium can be reproduced by amplifying this induced electromotive force or the output signal of the detection coil 41 and then detecting the amplified signal (e.g., peak detection).

The above is the principle of the fourth signal reproduction method according to this invention. In general, the ferromagnetic resonance frequency of the recording magnetization 44 is very high, several gigahertz to 20 gigahertz. Even if the high-frequency flux φrf itself is small, therefore, a large induced electromotive force is produced in proportional to the level of that frequency so that a sufficiently large reproduction signal output can be obtained.

Further, the ferromagnetic resonance is produced only by the recording magnetization 44 directly under the probe 15. As the induced electromotive force originated from this ferromagnetic resonance is detected to reproduce signals, the linear resolution in the reproduction mode is substantially determined by the thickness of the probe 15 in the longitudinal direction of the recording tracks alone. This means that a significantly large linear resolution (linear recording density) is obtainable. That is, the fourth signal reproduction can provide the same advantages as the second signal reproduction.

Fourteenth Embodiment

FIG. 23 is a perspective view showing the schematic structure of a magnetic recording and reproducing apparatus according to the fourteenth embodiment of this invention. The magnetic recording and reproducing apparatus of this embodiment comprises a magnetic recording medium 301 and a magnetic head 302.

The magnetic recording medium 301 is a so-called magnetic disk designed like a disk in this example, and has a base layer 312 and a recording layer 313 stacked in order on a non-magnetic disk substrate 311 with a protection film 314 formed on the recording layer 313 to secure the durability against the contact by the magnetic head 302 and insulation. Specifically, a glass substrate, 1.8 inches in diameter and 0.4 mm thick, was used as the disk substrate 311, the base layer 312 of Cr micro crystal was formed with a thickness db of 50 nm by sputtering under the environment of an argon gas, and the recording layer 313 of CoPtO having a planar magnetic anisotropy was formed with a thickness dr of 20 nm on the base layer 312 by DC magnetron sputtering under the argon-gas environment. The recording layer 313 had a magnetic force resistance Hc of 3,000 Oe and a saturation recording magnetization Isr of 8,000 G. A $ZrO_2$ film as the protection film 314 was formed with a thickness dp of 10 nm on the recording layer 313 by RF sputtering.

The magnetic head 302 has a recording head for magnetically recording signals on the magnetic recording medium 301 and a reproducing head for reproducing recorded signals, and is supported at the distal end portion of a needle-shaped head arm 303 of, for example, ceramics. The magnetic head 302 faces the magnetic recording medium 301 with a microspacing S with respect to the magnetic recording medium 301 or in contact therewith in some case. The magnetic head 302 is actuated by a head actuator (not shown) via the head arm 303 to be positioned on a desired track among a plurality of tracks 304, which are concentrically formed on the magnetic recording medium 301.

FIG. 24 is a diagram exemplarily showing the cross-sectional structures of the magnetic recording medium 301 and the magnetic head 302 in the magnetic recording and reproducing apparatus of this embodiment in the relative head-medium moving direction. In this diagram, a recording head 320 is a ring-shaped induction type head, and comprises a magnetic core 321 of FeN having a high magnetic permeability which is formed at the distal end portion of the head arm 303 by DC sputtering and a recording coil 322 wound around the magnetic core 321. The recording coil 322 is formed by a thin film process, and is wound by ten turns, for example. Both ends of the recording coil 322 are respectively connected to recording current input terminals 323a and 323b. As a recording current is supplied to the recording coil 322 from the recording current input terminals 323a and 323b, signals are magnetically recorded on the magnetic recording medium 301 by the recording magnetic field that is generated by the recording coil 322.

A reproducing head 330 is located adjacent to the recording head 320. In the reproducing head 330, a non-magnetic insulating layer 331 of, for example, alumina having a shape of a parallelopiped block is provided with integral with the magnetic core 321 of the recording head 320. This non-magnetic insulating layer 331 has a medium facing surface which faces the magnetic recording medium 301 and is in parallel to the recording medium 301. An insulating layer 332 with a thickness of 10 nm is formed of, for example, silicon oxide on this medium facing surface, and a replica magnetic layer 333 with a thickness of 10 nm is formed of, for example, a Co alloy on this insulating layer 332. The replica magnetic layer 333 has a magnetic force resistance Hc of approximately 900 Oe and a remnant magnetization Mr of 8,000 G.

A magnetic electrode 334 of, for example, Co for detecting the magnetization state of the replica magnetic layer 333 is arranged on the insulating layer 332, perpendicular to the replica magnetic layer 333 or at the right angles to the magnetic recording medium 301, while being covered with the non-magnetic insulating layer 331. The thickness of this magnetic electrode 334 or the size in the lengthwise direction of the recording tracks (the relative head-medium moving direction) is 30 nm, for example, and the width of the distal end of the magnetic electrode 334 or the size in the widthwise direction of the tracks (the radial direction of the magnetic recording medium 301) is approximately 0.5 $\mu$m.

The magnetic electrode 334 has magnetization of approximately 16,000 G and is magnetized in the direction perpendicular to the surface of the magnetic recording medium 301. The anisotropy of the elongated magnetic electrode 334 extending in the direction perpendicular to the surface of the magnetic recording medium 301 fixes the magnetization of the magnetic electrode 334, so that the leak magnetic fields from the recording layer 313 of the magnetic recording medium 301 and the magnetization of the replica magnetic layer 333 do not cause magnetization inversion. This fixed magnetization prevents the magnetic electrode 334 from being influenced by the leak magnetic field from the recording head 320 which is located adjacent to the reproducing head 330.

As apparent from the aforementioned materials, the replica magnetic layer 333 and the magnetic electrode 334 are both conductive. A voltage source 335 for applying a constant DC voltage between the replica magnetic layer 333 and the magnetic electrode 334 and a current detector 336 for detecting the magnetic tunnel current flowing between the replica magnetic layer 333 and the magnetic electrode 334 through the insulating layer 332 are connected to the reproducing head 330, which comprises the aforementioned non-magnetic insulating layer 331, insulating layer 332, replica magnetic layer 333 and magnetic electrode 334. The output of the current detector 336 is extracted from a reproduced signal output terminal 337 as a reproduced signal.

Figure 25:
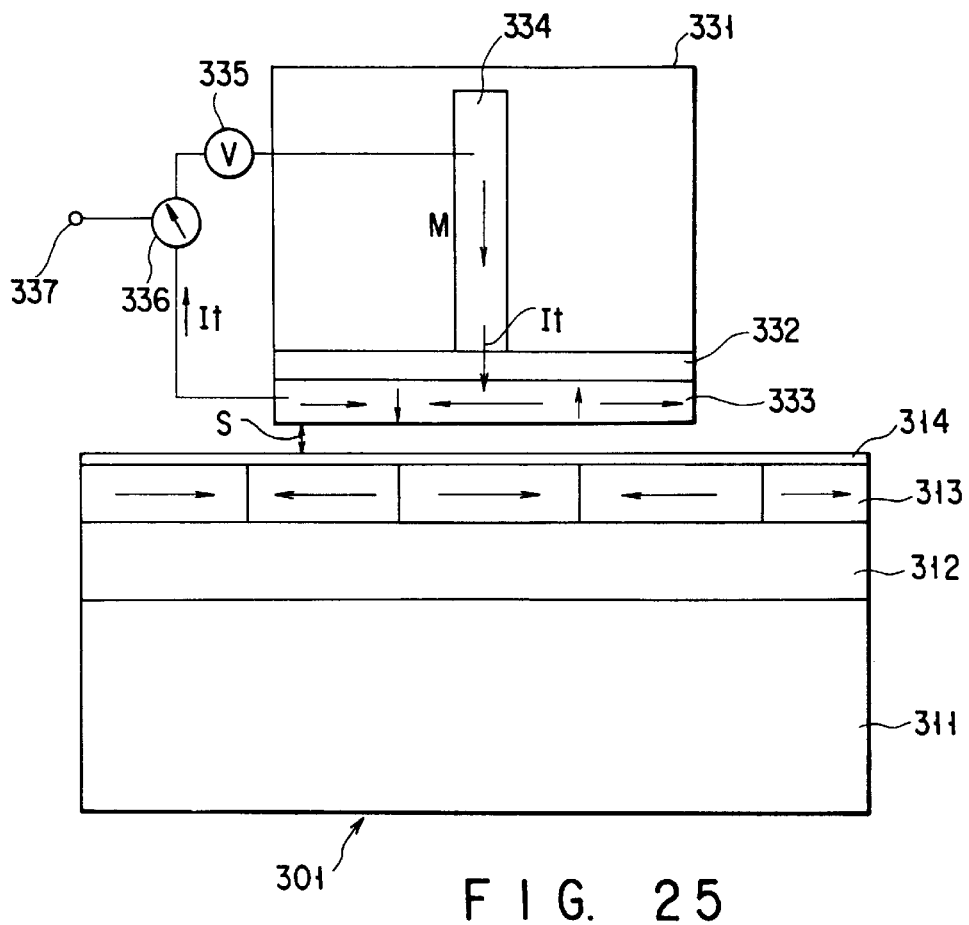
FIG. 25 is a cross-sectional view showing in enlargement the essential portions for explaining the operation of this embodiment.

The reproduction operation in this embodiment will now be explained with reference to FIG. 25. FIG. 25 shows in enlargement the essential portions shown in FIG. 24, and shows the magnetization states of the magnetic recording medium 301 and the reproducing head 330 in reproduction mode using arrows.

The leak magnetic field based on signals recorded on the recording layer 313 of the magnetic recording medium 301 magnetizes the replica magnetic layer 333 facing the magnetic recording medium 301 so that a magnetization transition pattern corresponding to the magnetization transition pattern of the recording layer 313 is formed on the replica magnetic layer 333. Because the magnetic force resistance Hc of the replica magnetic layer 333 is set significantly smaller than that of the recording layer 313, the replica magnetic layer 333 is easily magnetized by the leak magnetic field from the recording layer 313. As the replica magnetic layer 333 has a very small thickness of 10 nm, a relatively sharp magnetization transition pattern is formed even though the magnetic force resistance is small.

When a constant DC voltage V is applied by the voltage source 335 between the replica magnetic layer 333 whose magnetization changes in accordance with the leak magnetic field from the recording layer 313 and the magnetic electrode 334 whose magnetization is fixed in the direction perpendicular to the surface of the magnetic recording medium 301, the current (magnetic tunnel current) It which depends on the cosine cos $\theta$ of the angle $\theta$ defined by the magnetizations of the replica magnetic layer 333 and the magnetic electrode 334, flows through the insulating layer 332. As the magnetization of the replica magnetic layer 333 is parallel to the magnetization of the recording layer 313 or is directed in the planar direction at the midway position of the middle of the magnetization transition of the recording layer 313, the magnetization of the replica magnetic layer 333 and the magnetization of the magnetic electrode 334 are perpendicular to each other.

Directly above the magnetization transition of the recording layer 313, the magnetization of the replica magnetic layer 333 has a perpendicular component which is perpendicular to the surface of the magnetic recording medium 301 due to the electrostatic coupling of the recording layer 313 and the replica magnetic layer 333. In this case, the polarity of the magnetization transition of the recording layer 313 causes the perpendicular component of the magnetization of the replica magnetic layer 333 and the magnetization of the magnetic electrode 334 to become parallel or anti-parallel to each other. The magnetic tunnel current It changes in association with a change in the relationship between the magnetizations of the replica magnetic layer 333 and the magnetic electrode 334. By detecting this magnetic tunnel current It by means of the current detector 336, therefore, reproduced signals corresponding to the signals recorded on the recording layer 313 can be obtained from the reproduced signal output terminal 337.

Figure 26:
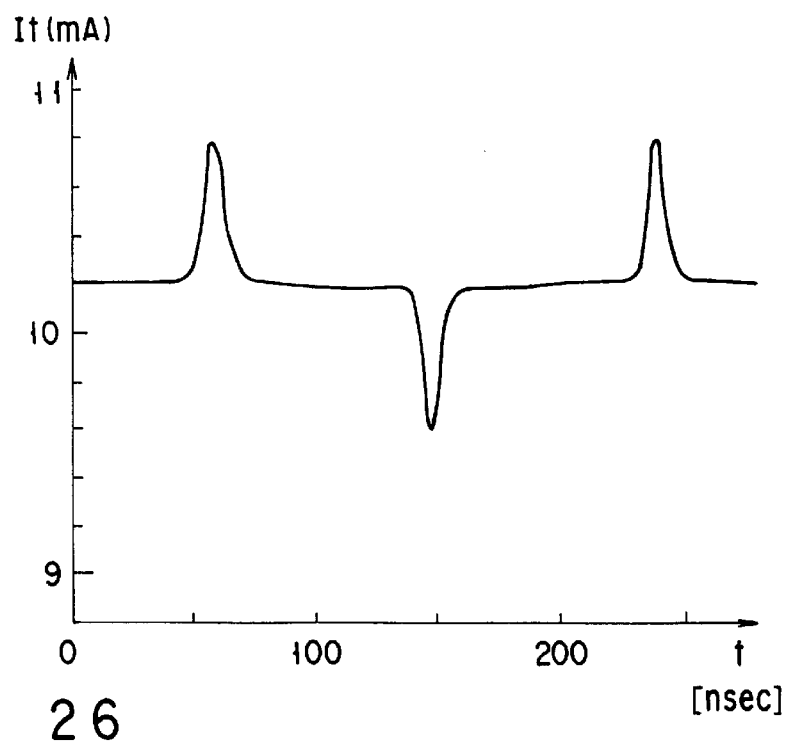
FIG. 26 is a diagram illustrating the waveform of a reproduced signal according to this embodiment.

FIG. 26 illustrates a change in the magnetic tunnel current It with time when signal reproduction is performed by the structure of this embodiment. The recording density was 56 kFCI, the relative moving speed of the magnetic recording medium 301 and the magnetic head 302 was 5 m per second, the spacing S between the magnetic recording medium 301 and the magnetic head 302 was 10 nm. The applied voltage V by the voltage source 335 was set to 200 mV (DC voltage). In this case, the peak-to-peak current changing ratio of the magnetic tunnel current It was 10.9%. The pulse width of the reproduced signals was approximately 8 nsec and the spatial length was about 40 nm close to the film thickness of 30 nm of the magnetic electrode 334, which proved that signal reproduction with high resolution could be accomplished.

Even if the spacing S between the head and the medium is significantly small so that both substantially contact each other, or are in a very low floating sate or are completely in contact with each other, the magnetic electrode 334 does not directly contact the magnetic recording medium 301 and thus avoids wearing caused by such contact. Therefore, stable signal reproduction becomes possible.

Fifteenth Embodiment

FIG. 27 is a cross-sectional view exemplarily showing the cross-sectional structures of a magnetic recording medium and a magnetic head in a magnetic recording and reproducing apparatus in the relative head-medium moving direction according to another embodiment of this invention. FIG. 27 shows the magnetization states of the magnetic recording medium and the individual sections of the reproducing head in reproduction mode by arrows.

Referring to FIG. 27, a magnetic recording medium 340 is a magnetic disk for vertical magnetic recording, has a soft magnetic backing layer 342 and a recording layer 343 stacked in order on a non-magnetic disk substrate 341 with a protection film 344 formed on the recording layer 343 to secure the durability against the contact by the magnetic head and insulation. More specifically, a glass substrate, 2.5 inches in diameter and 0.635 nm thick, was used as the disk substrate 341, and the soft magnetic backing layer 342 of FeSi was formed with a thickness db of 0.12 $\mu$m by DC magnetron sputtering under the environment of an argon gas. The soft magnetic backing layer 342 had a planar coercive force Hcs of 6 Oe and a saturation flux density Bsb of 15,000 G. The recording layer 343 of CoPtO vertical magnetic anisotropic film with a thickness dr of 100 nm was formed on the soft magnetic backing layer 342 by DC magnetron sputtering under the argon-gas environment. This recording layer 343 had a vertical coercive force Hch of 3,600 Oe and a saturation recording magnetization Isr of 9,000 G. An Sin film as the protection film 344 was formed with a thickness dp of 5 nm on the recording layer 343 by RF sputtering.

A recording head 350 for magnetically recording signals on the magnetic recording medium 340 and a reproducing head 360 for reproducing recorded signals are supported at the distal end portion of a needle-shaped head arm 303 made of, for example, SiC ceramics. The magnetic head 302 faces the magnetic recording medium 340 with a microspacing S with respect to the magnetic recording medium.

The recording head 350 is a vertical unipolar head, and comprises a main magnetic pole 351 of FeSi having a high magnetic permeability which is formed at the distal end portion of the head arm 303 by high-frequency sputtering and a recording coil 352 wound around the upper portion of the main magnetic pole 351 in the diagram. The recording coil 352 is covered with an insulator 353. The thickness Tr of the distal end of the main magnetic pole 351 (the size in the relative head-medium moving direction) was 0.2 $\mu$m, and the saturation flux density Bs was 19,000 G. The recording coil 352 is wound by five turns, for example. Both ends of the recording coil 352 are respectively connected to recording current input terminals 354a and 354b. As a recording current is supplied to the recording coil 352 from the recording current input terminals 354a and 354b, signals are magnetically recorded on the recording layer 343 of the magnetic recording medium 340 by the recording magnetic field that is generated from the distal end of the main magnetic pole 351.

A reproducing head 360 is located adjacent to the recording head 350. In the reproducing head 360, a non-magnetic insulating layer 361 of, for example, alumina having a shape of a parallelopiped block is provided with integral with the main magnetic pole 351. An insulating layer 362 with a thickness of 8 nm is formed of, for example, alumina on this medium facing surface of the non-magnetic insulating layer 361 which faces the magnetic recording medium 340 and is in parallel to the recording medium 340. A replica magnetic layer 363 with a thickness of 15 nm is formed of, for example, a CoZrCr alloy on this insulating layer 362. The replica magnetic layer 363 has a magnetic force resistance Hc of approximately 100 Oe and a remnant magnetization Mr of 5,000 G.

A magnetic electrode 364 of, for example, Fe for detecting the magnetization state of the replica magnetic layer 363 is arranged on the replica magnetic layer 363, perpendicular to the replica magnetic layer 363 or at the right angles to the magnetic recording medium 340, while being covered with the non-magnetic insulating layer 361. The thickness of this magnetic electrode 364 or the size in the relative head-medium moving direction is 20 nm, for example, and the width of the distal end of the magnetic electrode 364 or the size in the widthwise direction of the tracks (the radial direction of the magnetic recording medium 340) is approximately 0.3 $\mu$m.

The magnetic electrode 364 has magnetization of approximately 20,000 G and is magnetized in the direction perpendicular to the medium's surface by a magnetization fixing layer 365 which is arranged in contact with the upper portion of the magnetic electrode 364 and is made of, for example, a CoPt film. Therefore, the magnetization of the elongated magnetic electrode 364 is not inverted by the leak magnetic fields from the recording layer 343 of the magnetic recording medium 340 and the magnetization of the replica magnetic layer 363. This magnetization fixing layer 365 prevents the magnetic electrode 364 from being influenced by the leak magnetic field from the recording head 350 which is located adjacent to the reproducing head 360.

The magnetization fixing layer 364 is not essential and may be omitted. Further, such a magnetization fixing layer may be added to the structures of the previous embodiments.

As apparent from the aforementioned materials, the replica magnetic layer 363 and the magnetic electrode 364 are both conductive. A voltage source 366 for applying a constant DC voltage between the replica magnetic layer 363 and the magnetic electrode 364 and a current detector 367 for detecting the magnetic tunnel current flowing between the replica magnetic layer 363 and the magnetic electrode 364 through the insulating layer 362 are connected to the reproducing head 360, which comprises the aforementioned non-magnetic insulating layer 361, insulating layer 362, replica magnetic layer 363, magnetic electrode 364 and magnetization fixing layer 365. The output of the current detector 367 is extracted from a reproduced signal output terminal 368 as a reproduced signal.

The reproduction operation in this embodiment will now be explained.

The soft magnetic backing layer 342, the recording layer 343 and the replica magnetic layer 363 are magnetostatically coupled together, thus forming a stable circular mode magnetization. The replica magnetic layer 363 facing the magnetic recording medium 340 is magnetized by the leak magnetic field from the recording layer 343 which is based on signals recorded on the recording layer 343. Because the magnetic force resistance Hc of the replica magnetic layer 363 is set significantly smaller than that of the recording layer 343, the replica magnetic layer 363 is easily magnetized by the leak magnetic field from the recording layer 343.

When a constant DC voltage V is applied by the voltage source 366 between the replica magnetic layer 363 whose magnetization changes in accordance with the leak magnetic field from the recording layer 343 and the magnetic electrode 364 whose magnetization is fixed in the direction perpendicular to the surface of the magnetic recording medium 340, the current (magnetic tunnel current) It which depends on the cosine cos θ of the angle θ defined by the magnetizations of the replica magnetic layer 363 and the magnetic electrode 364, flows. Directly above the magnetization transition of the recording layer 343, the magnetization of the replica magnetic layer 363 and the magnetization of the magnetic electrode 364 are perpendicular to each other.

In the midway position of the magnetization transition of the recording layer 343, the magnetization of the replica magnetic layer 363 has a perpendicular component which is perpendicular to the surface of the magnetic recording medium 340 due to the electrostatic coupling of the recording layer 343 and the replica magnetic layer 363. In this case, the polarity of the magnetization transition of the recording layer 343 causes the perpendicular component of the magnetization of the replica magnetic layer 363 and the magnetization of the magnetic electrode 364 to become parallel or anti-parallel to each other. The magnetic tunnel current It changes in association with a change in the relationship between the magnetizations of the replica magnetic layer 363 and the magnetic electrode 364 as in the previous embodiment. By detecting this magnetic tunnel current It by means of the current detector 367, therefore, reproduced signals corresponding to the signals recorded on the recording layer 343 can be obtained from the reproduced signal output terminal 368.

This embodiment shows excellent reproduction resolution as per the previously described embodiments. Even if the spacing S between the head and the medium is significantly small so that both substantially contact each other, or are in a very low floating sate or are completely in contact with each other, the magnetic electrode 364 does not directly contact the magnetic recording medium 340 and thus avoids wearing caused by such contact. Therefore, stable signal reproduction becomes possible.

According to this invention, as described above, the magnetization pattern based on signals magnetically recorded on a magnetic recording medium is transferred onto the replica magnetic layer formed on the medium facing surface of the reproducing head, the magnetic electrode is provided on this replica magnetic layer with the insulating layer in between, and the magnetic tunnel current flowing through the replica magnetic layer and the magnetic electrode is detected to reproduce the signals recorded on the magnetic recording medium. It is therefore possible to significantly improve the reproduction resolution.

The magnetic electrode is located inside the head, i.e., inside the non-magnetic insulating layer and is not exposed, and faces the magnetic recording medium via the replica magnetic layer and the insulating layer. It is thus possible to prevent the magnetic electrode from wearing or being corroded by the contact with the magnetic recording medium. It is therefore possible not only to improve the recording density of the magnetic recording and reproducing apparatus and the memory capacity, but also to provide a magnetic recording and reproducing apparatus which has excellent durability and highly reliability.

According to this invention, the high linear recording density of several hundreds kFCI or higher can be achieved, signals recorded on very narrow tracks formed on the submicron order can be reproduced with a high precision and high SN ratio over a wide frequency band, and crosstalk from the adjoining recording tracks is significantly small. Since the structure of the reproduction probe is significantly simple, the working process is very easy and the working precision is high, thus ensuring a high manufacturing yield.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic recording and reproducing apparatus for performing signal recording and reproduction using a disk-shaped magnetic recording medium having a non-conductive non-magnetic layer provided on a conductive recording layer, said apparatus comprising:

a probe made of a ferromagnetic film in such a way as to be movable relative to said magnetic recording medium while having a distal end facing said magnetic recording medium;

a head section having a recording element for recording a signal on said magnetic recording medium and a reproducing element including at least said probe for reproducing a signal recording on said magnetic recording medium;

a head slider for mounting said head section, said head slider, including, a slider section having a slider surface facing said magnetic recording medium in such a way as to receive a hydrodynamic force generated by a dynamic effect of a gaseous flow caused by rotation of said magnetic recording medium, and a head support, coupled to said slider section, for supporting said head section in such a way that said reproducing element contacts said magnetic recording medium, said head support having a mass smaller than that of said, slider section, an area of a surface of said head support facing said magnetic recording medium being smaller than an area of said slider surface, in order that said reproducing element can stably and reliably run in contact with said magnetic recording medium;

DC voltage application means for applying a DC voltage between said probe and said recording layer; and means for detecting a tunnel current caused to flow between said distal end of said probe and said recording layer through said non-magnetic layer by application of said DC voltage by said DC voltage application means, thereby reproducing a signal recorded on said magnetic recording medium.

2. The magnetic recording and reproducing apparatus according to claim 1, wherein said probe has an antiferromagnetic film or a hard magnetic film stacked thereon to fix magnetization of said probe in a predetermined direction.

3. The magnetic recording and reproducing apparatus according to claim 1, further comprising:

current detection means for detecting said tunnel current;

a low-pass filter for receiving an output signal of said current detection means; and control means for controlling a DC voltage to be applied by said DC voltage application means based on a difference between an output signal of said low-pass filter and a target signal.

4. The magnetic recording and reproducing apparatus according to claim 3, wherein said probe has an antiferromagnetic film or a hard magnetic film stacked thereon to fix magnetization of said probe in a predetermined direction.

5. A magnetic recording and reproducing apparatus for performing signal recording and reproduction using a disk-shaped magnetic recording medium having a non-conductive non-magnetic layer provided on a conductive recording layer, said apparatus comprising:

a probe made of a ferromagnetic film in such a way as to be movable relative to said magnetic recording medium while having a distal end facing said magnetic recording medium;

a head section having a recording element for recording a signal on said magnetic recording medium and a reproducing element including at least said probe for reproducing a signal recording on said magnetic recording medium;

a head slider for mounting said head section, said head slider, including, a slider section having a slider surface facing said magnetic recording medium in such a way as to receive a hydrodynamic force generated by a dynamic effect of a gaseous flow caused by rotation of said magnetic recording medium, and a head support, coupled to said slider section, for supporting said head section in such a way that said reproducing element contacts said magnetic recording medium, said head support having a mass smaller than that of said slider section, an area of a surface of said head support facing said magnetic recording medium being smaller than an area of said slider surface, in order that said reproducing element can stably and reliably run in contact with said magnetic recording medium;

constant current supply means connected to said probe, for supplying a constant current between said distal end of said probe and said recording layer through said non-magnetic layer, so as to flow a constant tunnel current between said probe and said recording layer; and means for detecting a change in a voltage produced between said probe and said recording layer based on said constant tunnel current, thereby reproducing a signal recorded on said magnetic recording medium.

6. The magnetic recording and reproducing apparatus according to claim 5, wherein said probe has an antiferromagnetic film or a hard magnetic film stacked thereon to fix magnetization of said probe in a predetermined direction.

7. A magnetic recording and reproducing apparatus comprising:

recording means for recording a signal on a magnetic recording medium; and reproduction means for reproducing a signal recorded on said magnetic recording medium, said reproduction means including, an insulating layer provided on a surface parallel to said magnetic recording medium and facing said magnetic recording medium, a conductive replica magnetic layer, provided on a face of said insulating layer facing said magnetic recording medium, for forming magnetization corresponding to a magnetic field from said magnetic recording medium, a magnetic electrode provided with one end in contact with an opposite surface of said insulating layer to said surface where said replica magnetic layer is provided, voltage application means for applying a predetermined voltage between said magnetic electrode and said replica magnetic layer, and current detection means for detecting a current flowing between said replica magnetic layer and said magnetic electrode through said insulating layer based on voltage application by said voltage application means.

8. The magnetic recording and reproducing apparatus according to claim 7, wherein said magnetic electrode has magnetization fixed in a direction perpendicular to a surface of said magnetic recording medium.

9. A magnetic recording and reproducing apparatus comprising:

recording means for recording a signal on a magnetic recording medium; and reproduction means for reproducing a signal recorded on said magnetic recording medium, said reproduction means including, a non-magnetic insulating member having a medium facing surface facing said magnetic recording medium and parallel to said magnetic recording medium, an insulating layer provided on said medium facing surface of said non-magnetic insulating member;

a conductive replica magnetic layer, provided on a face of said insulating layer facing said magnetic recording medium, for forming magnetization corresponding to a magnetic field from said magnetic recording medium, a magnetic electrode provided with one end in contact with an opposite surface of said insulating layer to said surface where said replica magnetic layer is provided, said magnetic electrode being covered with said non-magnetic insulating member, voltage application means for applying a predetermined voltage between said magnetic electrode and said replica magnetic layer, and current detection means for detecting a current flowing between said replica magnetic layer and said magnetic electrode through said insulating layer based on voltage application by said voltage application means.

10. The magnetic recording and reproducing apparatus according to claim 9, wherein said magnetic electrode has magnetization fixed in a direction perpendicular to a surface of said magnetic recording medium.

* * * * *